Dec. 22, 1964     A. JAZBUTIS     3,162,362
VOTING MACHINE AND SYSTEM
Filed Oct. 27, 1959                        26 Sheets-Sheet 1

INVENTOR:
ANATOLIJUS JAZBUTIS
BY:
Beau, Brooks, Buckley & Beau,
ATTORNEYS.

Dec. 22, 1964     A. JAZBUTIS     3,162,362

VOTING MACHINE AND SYSTEM

Filed Oct. 27, 1959     26 Sheets-Sheet 2

FIG. 2

| A1 GOVERNOR Vote for 1 | B1 STATE REPRESENTATIVE Vote for 3 | | C1 | D |
|---|---|---|---|---|
| A2 SMITH ✗ | B2 JAMES ✗ | C2 BROWN ✗ | | D |
| A3 JONES ✗ | B3 GREEN ✗ | C3 WEBSTER ✗ | | D |
| A4 WRITE-IN 76 ⊚ | B4 CARLSON ✗ | C4 WRITE-IN ⊚ | | |
| A5 SENATOR Vote for 1 | B5 TREASURER OF STATE Vote for 1 | C5 ATTORNEY GENERAL Vote for | | |
| A6 WHISTLER ✗ | B6 WHITE ✗ | C6 | | |
| A7 PERA ✗ | B7 R | | | |

| A1 GOVERNOR | B1 STATE REPRESENTATIVE | | C1 | D |
|---|---|---|---|---|
| A2 1357-64 | B2 1234 | C2 4687 | | D |
| A3 0421 | B3 0621 | C3 5214 | | |
| A4 0000 | B4 1001 | C4 | | |
| A5 SENAT | | | | |

50

*INVENTOR:*
*ANATOLIJUS JAZBUTIS*
BY:
*Beau, Brooks, Buckley & Beau,*
*ATTORNEYS.*

Dec. 22, 1964     A. JAZBUTIS     3,162,362
VOTING MACHINE AND SYSTEM
Filed Oct. 27, 1959     26 Sheets-Sheet 4
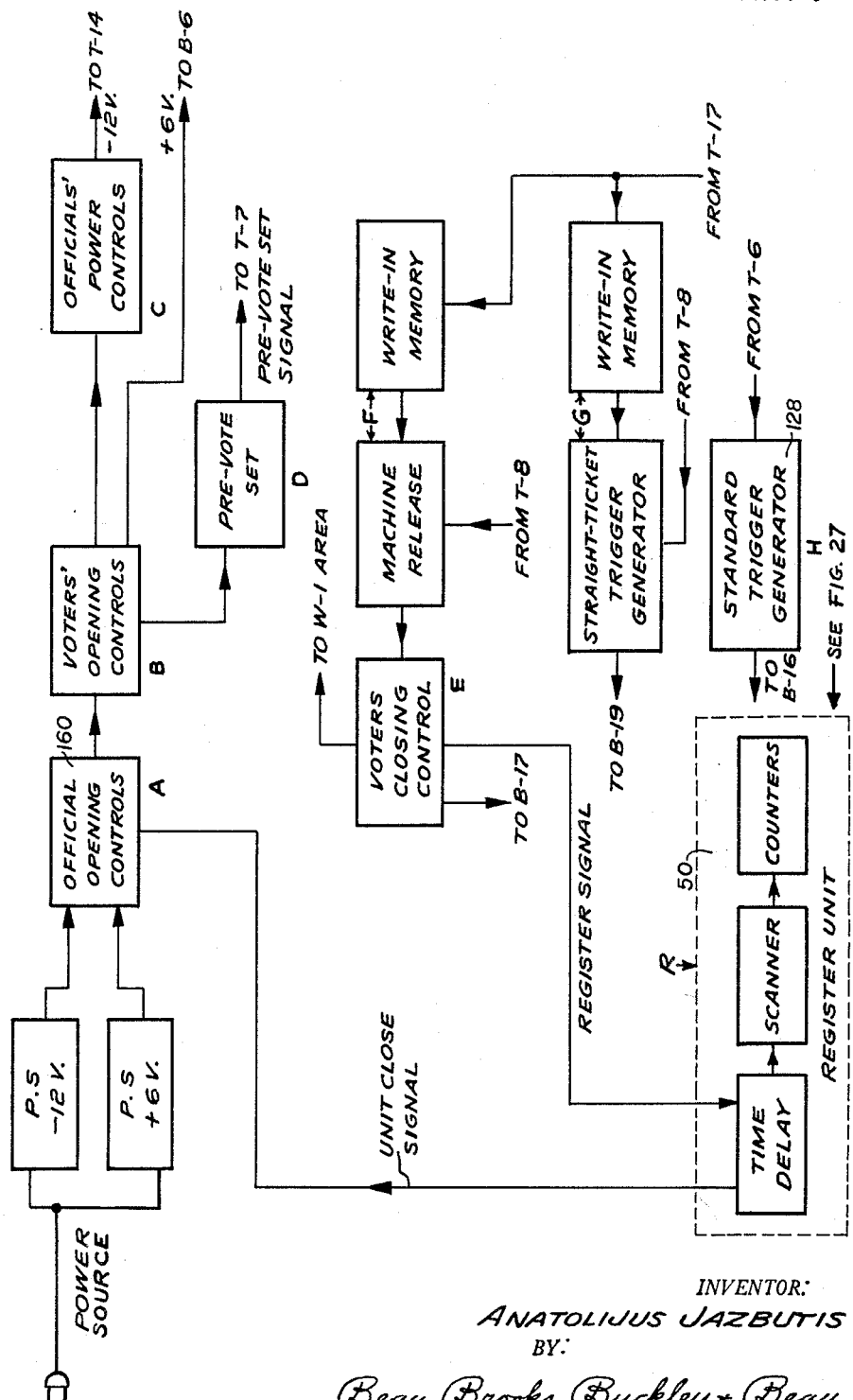
INVENTOR:
ANATOLIJUS JAZBUTIS
BY:
Beau, Brooks, Buckley & Beau,
ATTORNEYS.

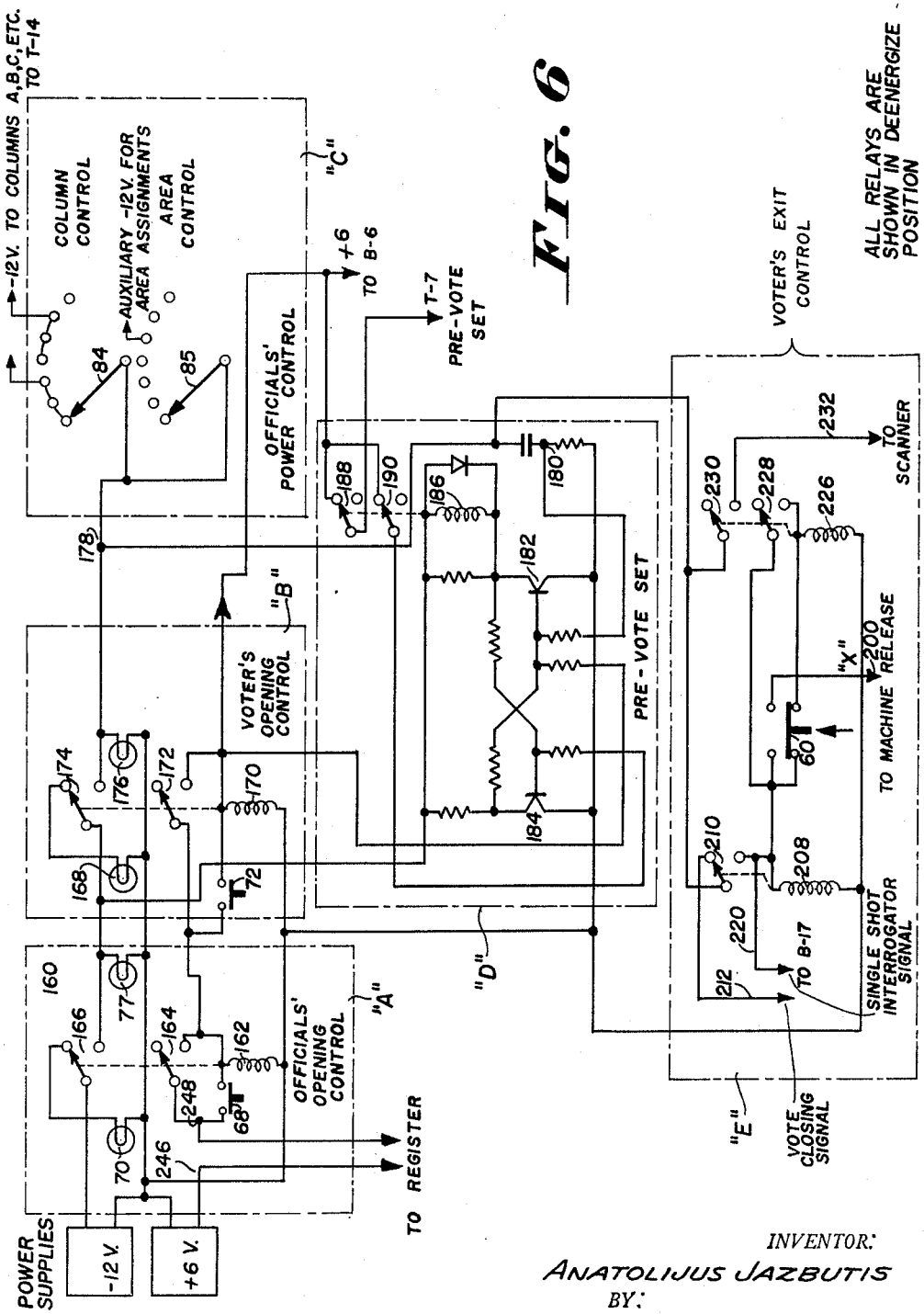

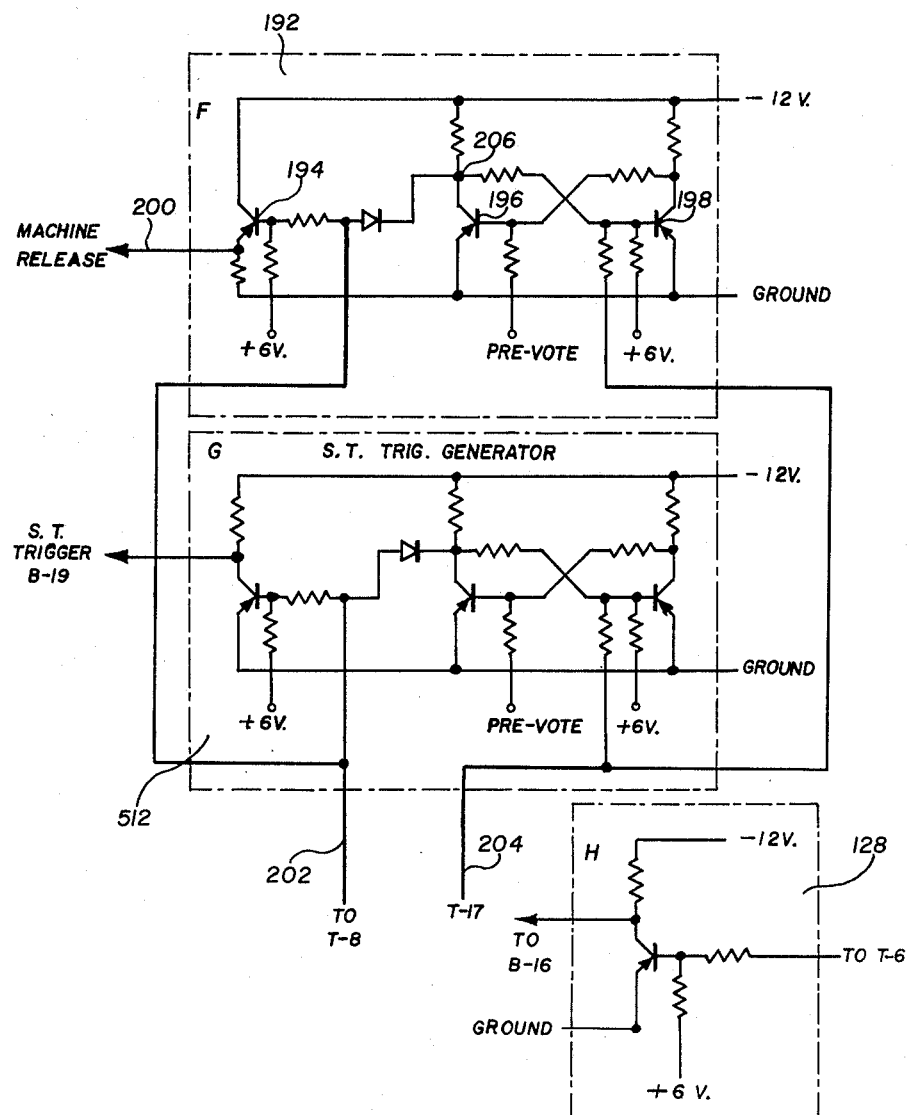

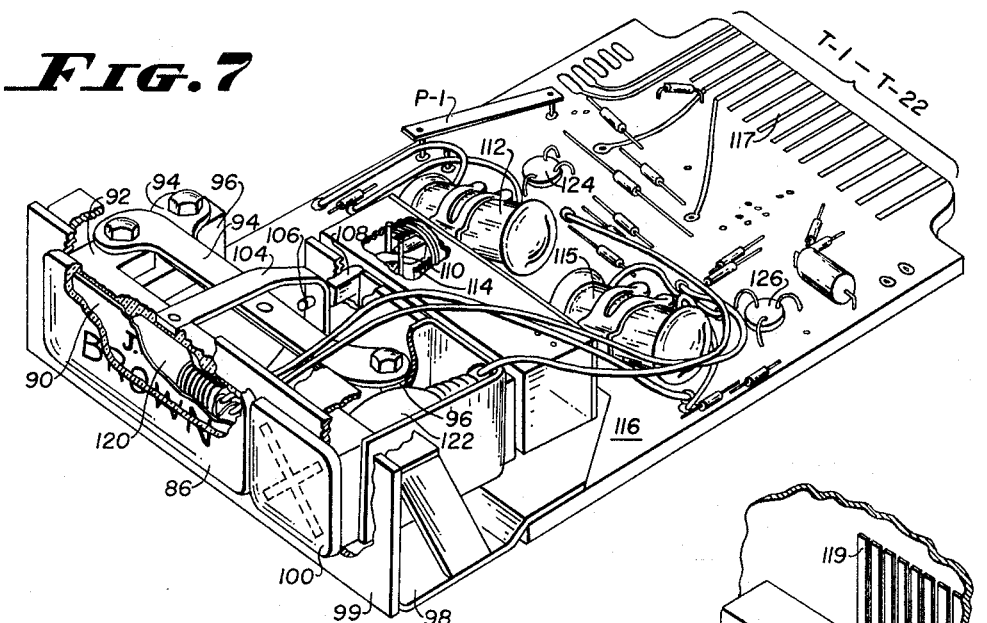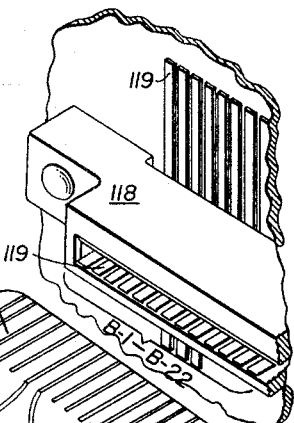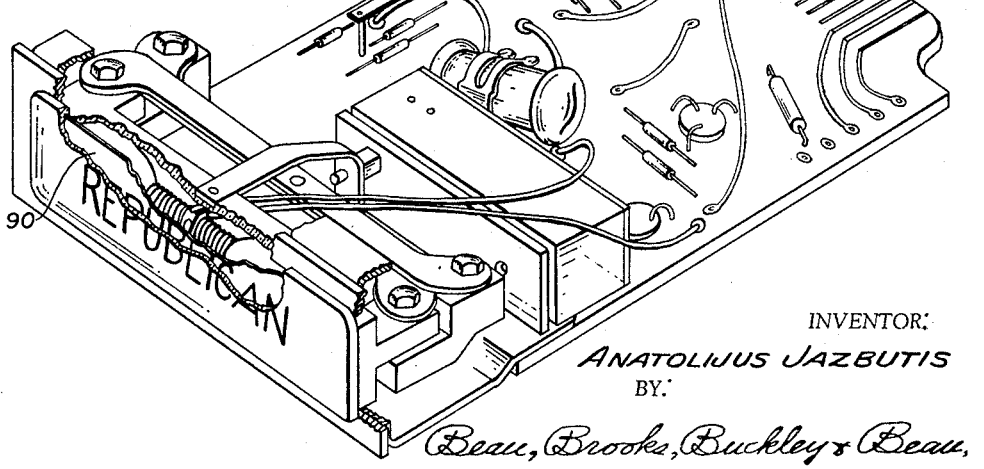

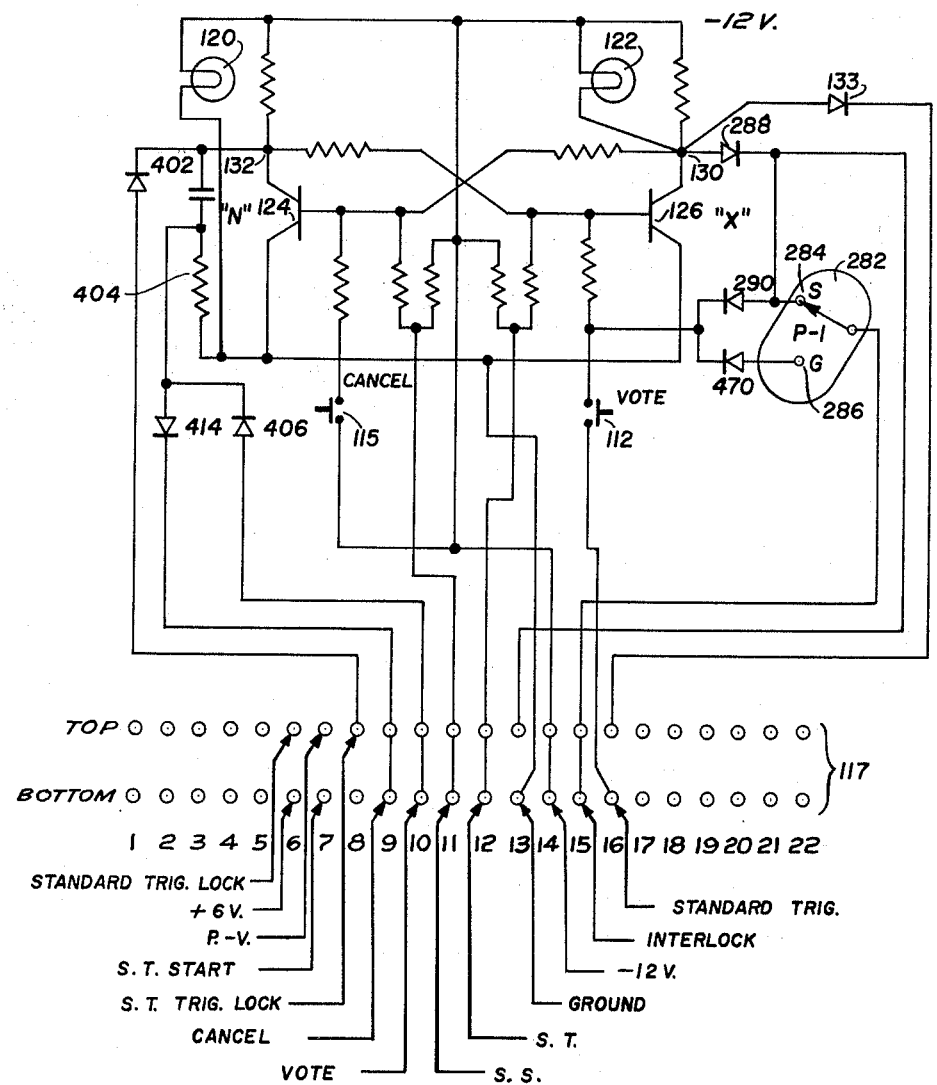

Dec. 22, 1964 A. JAZBUTIS 3,162,362
VOTING MACHINE AND SYSTEM
Filed Oct. 27, 1959 26 Sheets-Sheet 9

INVENTOR.
ANATOLIJUS JAZBUTIS
BY:
Beau, Brooke, Buckley & Beau,
ATTORNEYS.

Dec. 22, 1964     A. JAZBUTIS     3,162,362
VOTING MACHINE AND SYSTEM
Filed Oct. 27, 1959     26 Sheets-Sheet 12

INVENTOR:
ANATOLIJUS JAZBUTIS
BY:
Beau, Brooks, Buckley & Beau,
ATTORNEYS.

Dec. 22, 1964  A. JAZBUTIS  3,162,362
VOTING MACHINE AND SYSTEM
Filed Oct. 27, 1959  26 Sheets-Sheet 14

INVENTOR:
ANATOLIJUS JAZBUTIS
BY:
Beau, Brooke, Buckley & Beau,
ATTORNEYS.

Dec. 22, 1964  A. JAZBUTIS  3,162,362
VOTING MACHINE AND SYSTEM
Filed Oct. 27, 1959  26 Sheets-Sheet 16

INVENTOR:
ANATOLIJUS JAZBUTIS
BY:
Beau, Brooks, Buckley & Beau,
ATTORNEYS.

Dec. 22, 1964     A. JAZBUTIS     3,162,362
VOTING MACHINE AND SYSTEM
Filed Oct. 27, 1959     26 Sheets-Sheet 17

INVENTOR:
ANATOLIJUS JAZBUTIS
BY:
Beau, Brooks, Buckley & Beau,
ATTORNEYS.

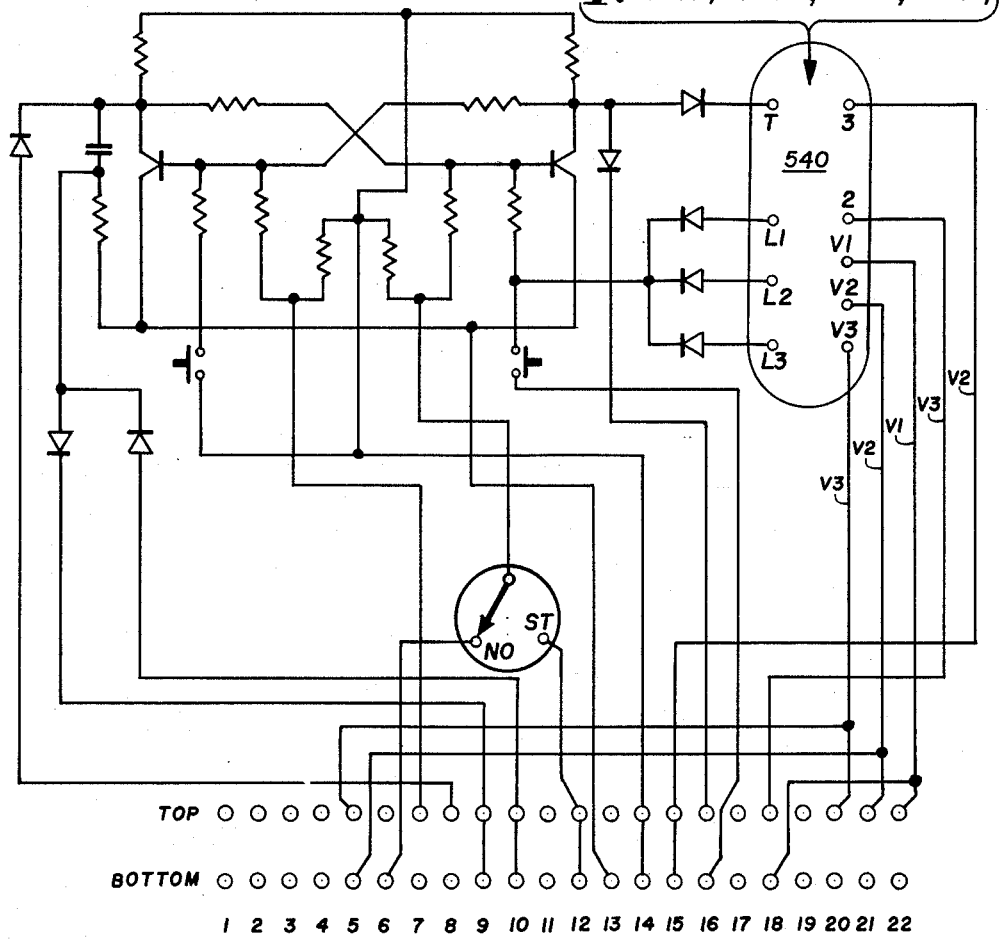

Fig. 21

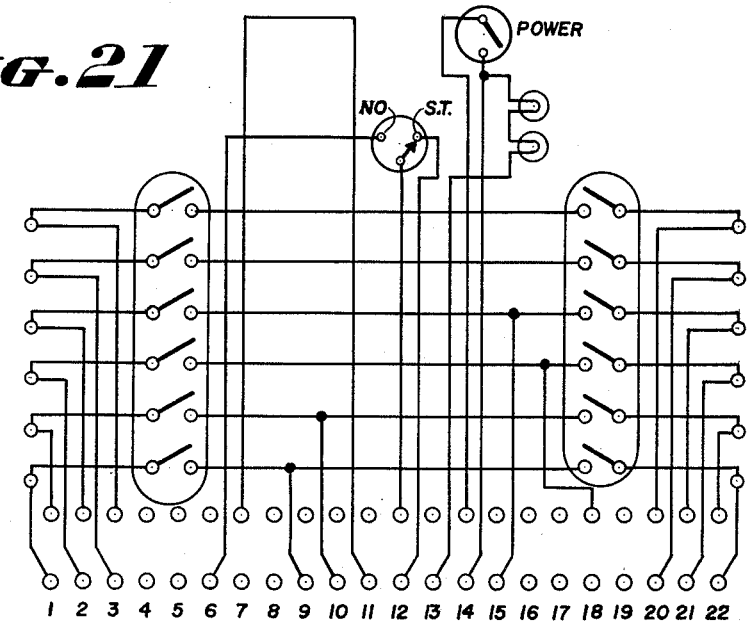

Fig. 22

|  | BOTTOM | TOP |  |
|---|---|---|---|
| CANCEL — CROSS | ○ 1 | ○ CROSS — | VOTE |
| N OF M SET (S.P.) — CROSS | ○ 2 | ○ CROSS — | COUNT BACK |
| INTERLOCK AND S.S. — CROSS | ○ 3 | ○ CROSS — | COUNT FORWARD |
| N.U. | ● 4 | ● N.U. |  |
| ACC. V-2 | ○ 5 | ○ ACC. V-3 |  |
| +6 V. | ○ 6 | ○ STANDARD TRIGGER LOCK FROM S—MOD. |  |
| S.T. START TO C-MOD. FROM PARTY MOD. | ○ 7 | ○ PRE-VOTE SET |  |
| N.U. | ● 8 | ○ S.T. TRIGGER LOCK TO S.P. TRIGGER AND MACHINE RELAY |  |
| CANCEL | ○ 9 | ○ CANCEL |  |
| VOTE | ○ 10 | ○ VOTE |  |
| S.S. | ○ 11 | ○ S.S. |  |
| S.T. | ○ 12 | ○ S.T. |  |
| GROUND | ○ 13 | ○ ENDORSED CANDIDATE |  |
| −12 V. | ○ 14 | ○ −12 V. |  |
| INTERLOCK | ○ 15 | ○ INTERLOCK |  |
| STANDARD TRIGGER | ○ 16 | ○ REGISTER |  |
| S.S. INTERROGATOR | ○ 17 | ○ TO WRITE-IN MEMORY |  |
| ACC. 1 | ○ 18 | ○ ACC. 2 |  |
| S.T. TRIG. ON TOP ROW (OTHERS N.U.) | ○ 19 | ○ N OF M SET BY S.T. |  |
| INTERLOCK AND S.S.-CROSS | ○ 20 | ○ CROSS - COUNT FORWARD (ACC. V-3) |  |
| N OF M SET (S.T.) - CROSS | ○ 21 | ○ CROSS - COUNT BACK (ACC. V-2) |  |
| CANCEL - CROSS | ○ 22 | ○ CROSS - VOTE (ACC. V-1) |  |

Dec. 22, 1964        A. JAZBUTIS        3,162,362

VOTING MACHINE AND SYSTEM

Filed Oct. 27, 1959        26 Sheets-Sheet 21

INVENTOR:
ANATOLIJUS JAZBUTIS
BY:
Beau, Brooke, Buckley & Beau,
ATTORNEYS.

Dec. 22, 1964    A. JAZBUTIS    3,162,362
VOTING MACHINE AND SYSTEM
Filed Oct. 27, 1959    26 Sheets-Sheet 22

INVENTOR:
ANATOLIJUS JAZBUTIS
BY: Beau, Brooks, Buckley & Beau,
ATTORNEYS.

Dec. 22, 1964   A. JAZBUTIS   3,162,362
VOTING MACHINE AND SYSTEM
Filed Oct. 27, 1959   26 Sheets-Sheet 23

INVENTOR:
ANATOLIJUS JAZBUTIS
BY:
Beau, Brooks, Buckley & Beau,
ATTORNEYS.

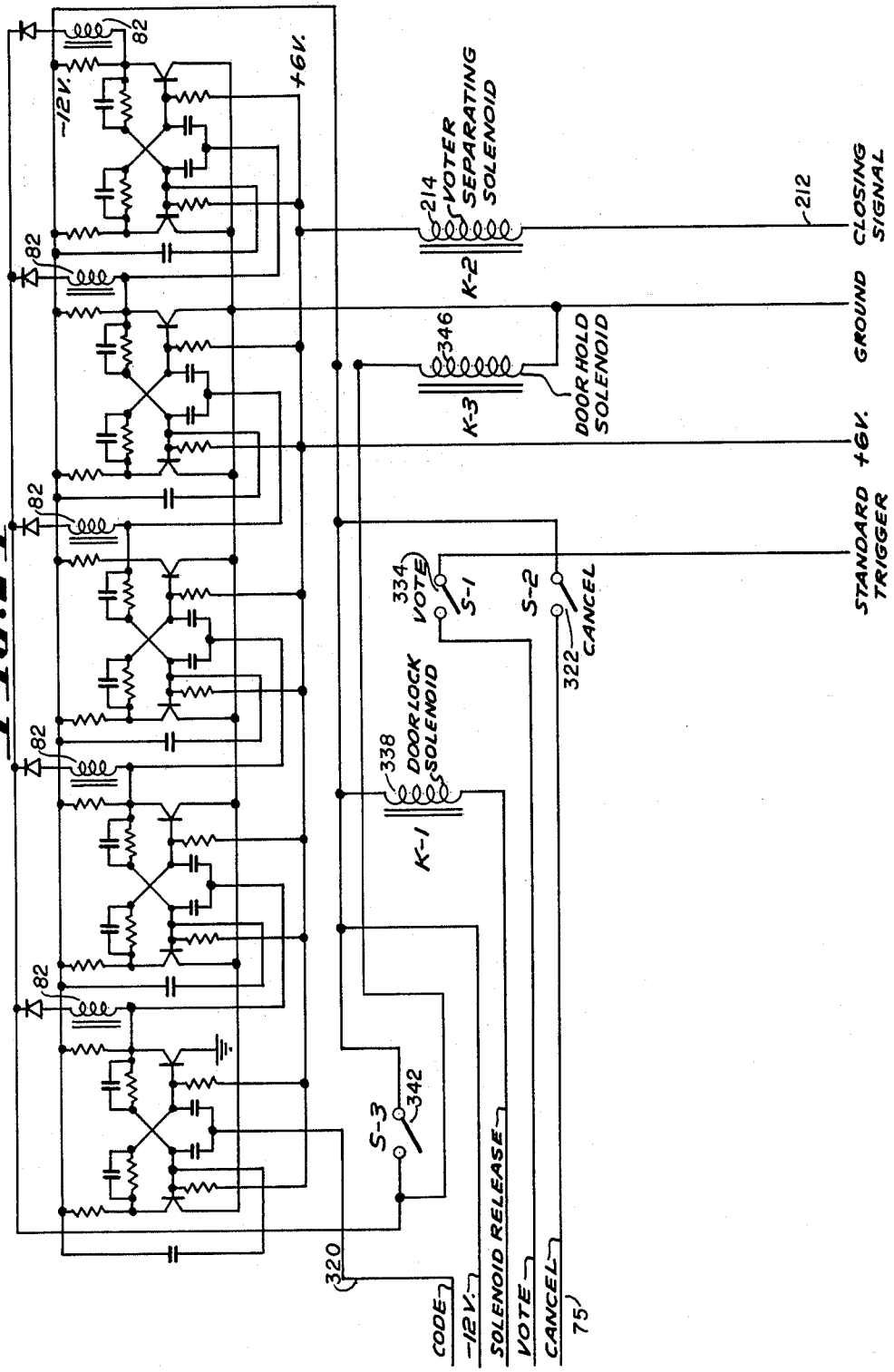

Dec. 22, 1964   A. JAZBUTIS   3,162,362
VOTING MACHINE AND SYSTEM
Filed Oct. 27, 1959   26 Sheets-Sheet 25

INVENTOR:
ANATOLIJUS JAZBUTIS
BY:
Beau, Brooks, Buckley & Beau,
ATTORNEYS.

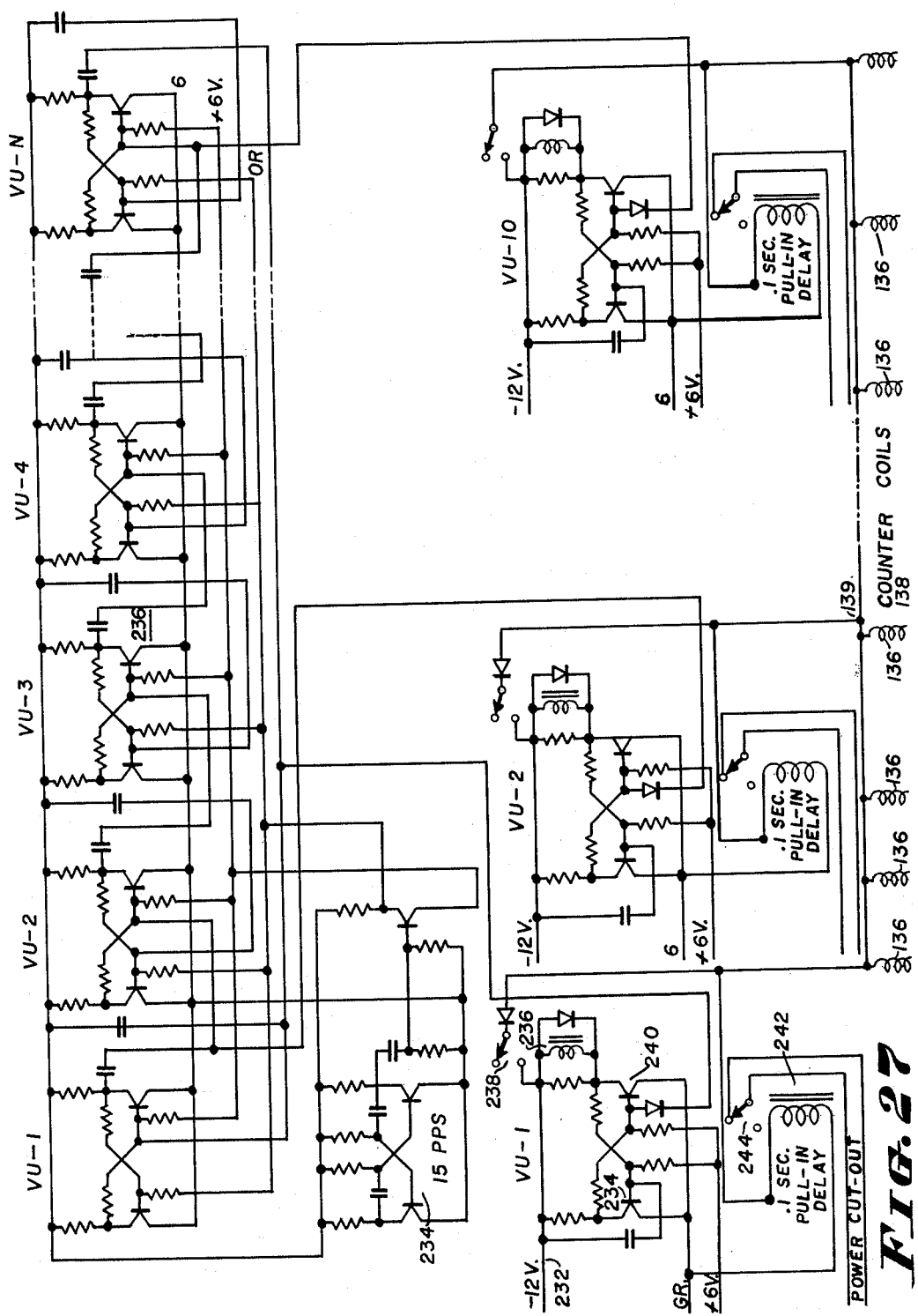

United States Patent Office 3,162,362
Patented Dec. 22, 1964

3,162,362
VOTING MACHINE AND SYSTEM
Anatolijus Jazbutis, Jamestown, N.Y., assignor, by mesne assignments, to Automatic Voting Machine Corporation, Jamestown, N.Y., a corporation of Delaware
Filed Oct. 27, 1959, Ser. No. 849,067
19 Claims. (Cl. 235—54)

This invention relates to electoral voting systems, and more particularly to an electronically operated system wherein a plurality of voting units may serve a single or "central" vote registering device.

Prior voting systems definitely involve certain limitations and shortcomings such as, for example, limited flexibility for adaptation to varieties of election ballots. Such systems are of low "utilization factor" characteristics because of their limited abilities to accommodate "write-in" votes while meeting other necessary requirements, such as are specified by local laws. For the same reasons such prior systems are of low ballot capacities, and lack resemblance to self-explanatory paper ballot presentations. Also, the prior systems lacked the ability to share a single "central" registering device among pluralities of voting panels. Mechanical and structural complexities inherent in "mechanical" voting machines involve serious weight and size problems.

One of the objects of the present invention is to provide an improved voting system which is of increased versatility, being thereby adapted to meet a large variety of election ballot requirements while utilizing in each instance an increased portion of the available voting points, thereby increasing the "utilization factor" of the system.

Another object of the invention is to provide in a system as aforesaid an improved arrangement whereby a single vote registering unit may be shared by pluralities of voting units.

Another object of the invention is to provide an improved system as aforesaid whereby the process of programming the system for a given election ballot is substantially simplified, and can be performed by relatively unskilled personnel.

Another object is to provide a system as aforesaid which is of improved reliability and fool-proof in operation, and wherein the equipment is of durable type.

Another object is to provide a system as aforesaid wherein the operative components are relatively light weight and therefore readily portable; while being at the same time rugged and invulnerable to damage such as during transport from place to place.

Another object is to provide in a voting system as aforesaid an improved voting unit facilitating provision of a visually understandable "paper ballot" type presentation of the ballot to be voted, and facilitating the voter's registering of his votes in full secrecy.

Another object is to provide an improved system as aforesaid which operates automatically to prevent overvoting, and which is fully adaptable for inclusion of fraud preventing auxiliary devices.

Still another object is to provide a voting system as aforesaid whereby the total registered votes of the system are adaptable to be canvassed through a central station by means of a telemetering device or the like.

Other objects and advantages of the invention will appear from the specification hereinafter, including abbreviation index as follows:

S-Mod. (Standard module)
O-S-Mod. (Single office module)
O-G-Mod. (Group office module)
P-G-Mod. (Party-gen'l. election-module)
P-P-Mod. (Party-selective primary-module)
C-Mod. (Compensator module)
W-Mod. (Write-in module)
W-Acc-Mod. (Write-in-accumulator-module)
W-Area (Write-in area)
S-Acc-Mod. (Standard accumulator module)
O-S-Acc-Mod. (Single office accumulator module)
O-G-Acc-Mod. (Group office accumulator module)
S-O-Mod. (Straight office module)
ST (Straight ticket voting)
OP (Open primary voting)
SP (Selective primary)
IV (Individual vote)
O-ST-IV (Type of election where voter has *option* vote either straight ticket or individual vote or both)
M-St-IV (Type of election where it is *mandatory* that a straight ticket has to be voted first. Individual voting is then possible if desired)
SS (Anti-single shot)
EC (Endorsed candidate)
S-Trig. (Standard trigger)
S-T-Trig. (Straight ticket trigger)
Acc. (Accumulator)
FD (Forward drive)
BD (Backward drive)
RD (Ring drive)
PV (Pre-Vote Set)

By way of one example of physical embodiment of the invention, a system is illustrated herein by the accompanying drawing, wherein:

FIG. 2 is a fragmentary illustration on enlarged scale of a portion of the voting face of the unit illustrated in FIG. 1;

FIG. 4a is a fragmentary illustration on enlarged scale of a portion of the scoreboard panel of the register unit of FIG. 4;

FIG. 5 is a block diagram of the control circuit of the voting unit, including the power supply arrangements;

FIG. 6 is a schematic of a portion of the control circuit of a voting unit of the system of the invention; subdivisions beng designated by the letters A, B, C, D, E;

FIG. 6a is a view corresponding to FIG. 6 but of another portion of the control circuit including subdivisions F, G, H;

FIG. 7 is a perspective view of a typical "standard" or "S-mod" type module, which is a component of the voting unit of FIG. 1;

FIG. 8 is a perspective view of a typical "P-G" module component of the unit of FIG. 1, including a fragmentary showing of the plug-in backboard of the voting unit;

FIG. 9 is a schematic diagram of an 8-module component of the voting unit, of the type illustrated by FIG. 7;

Figure 1:
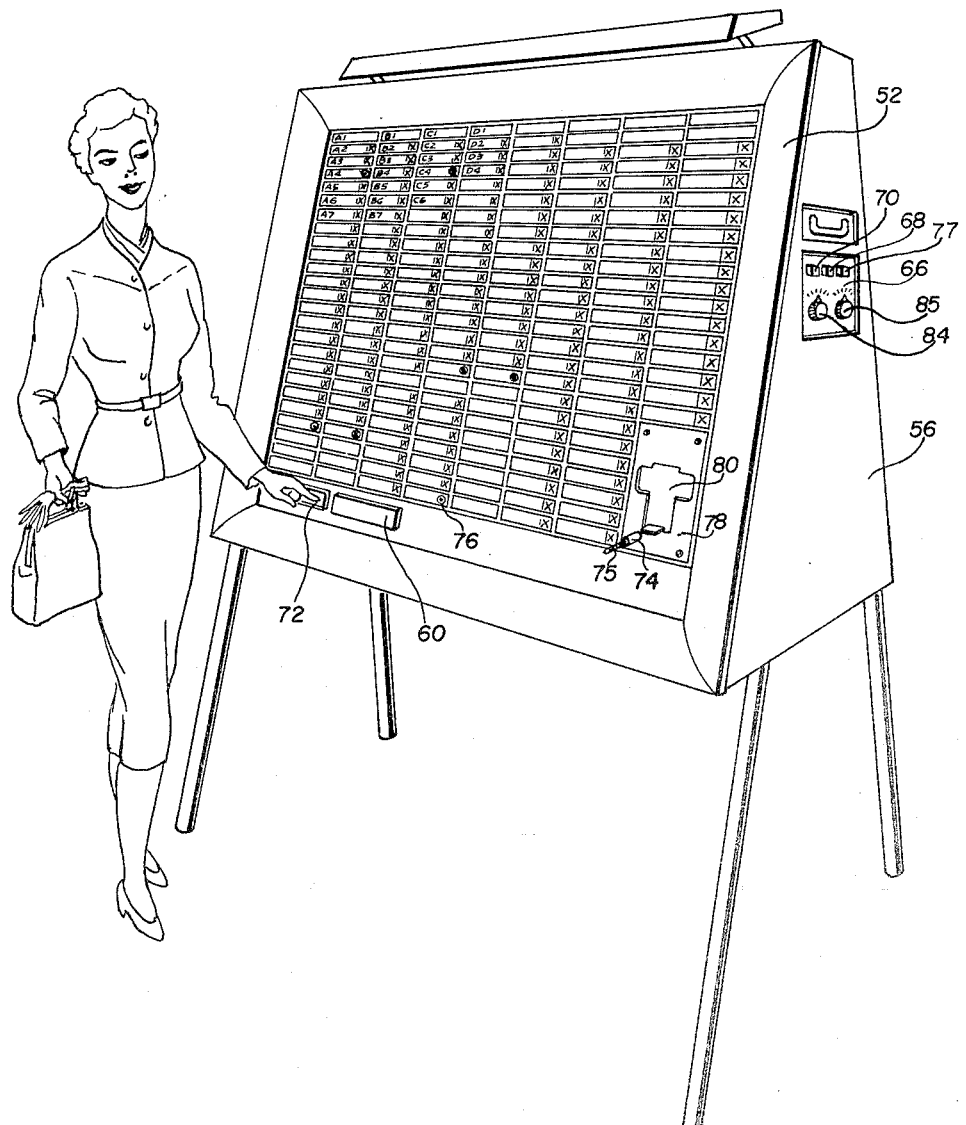
FIG. 1 is a general perspective view of a voting unit component of the system of the present invention.
Figure 12:
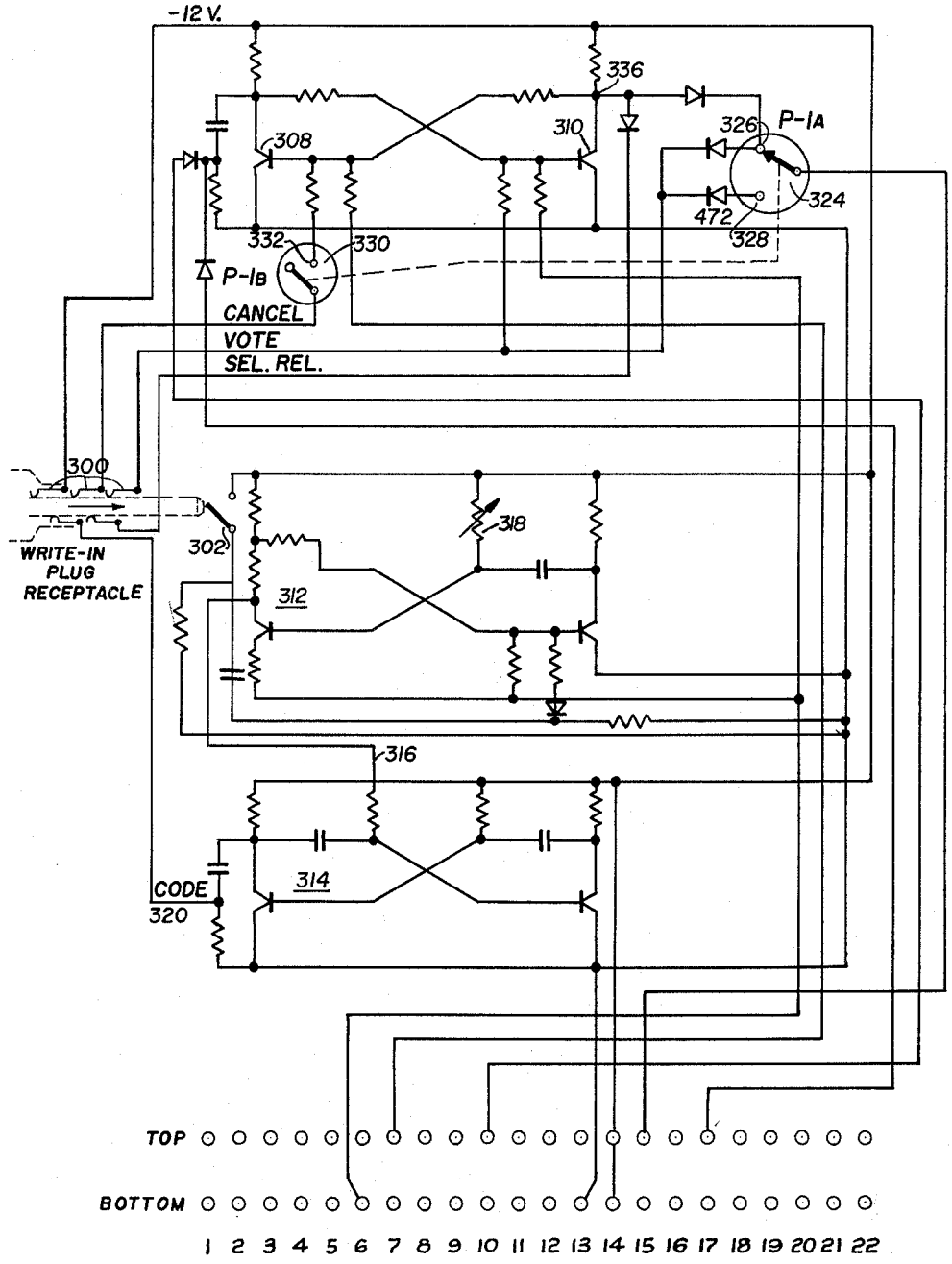
FIG. 12 is a schematic diagram of a write-in or "W-mod" type module.
Figure 24A:
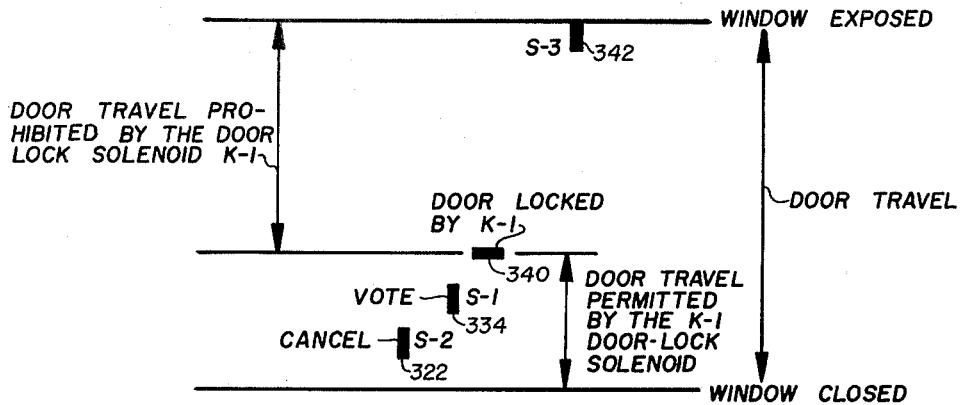
Figure 13:
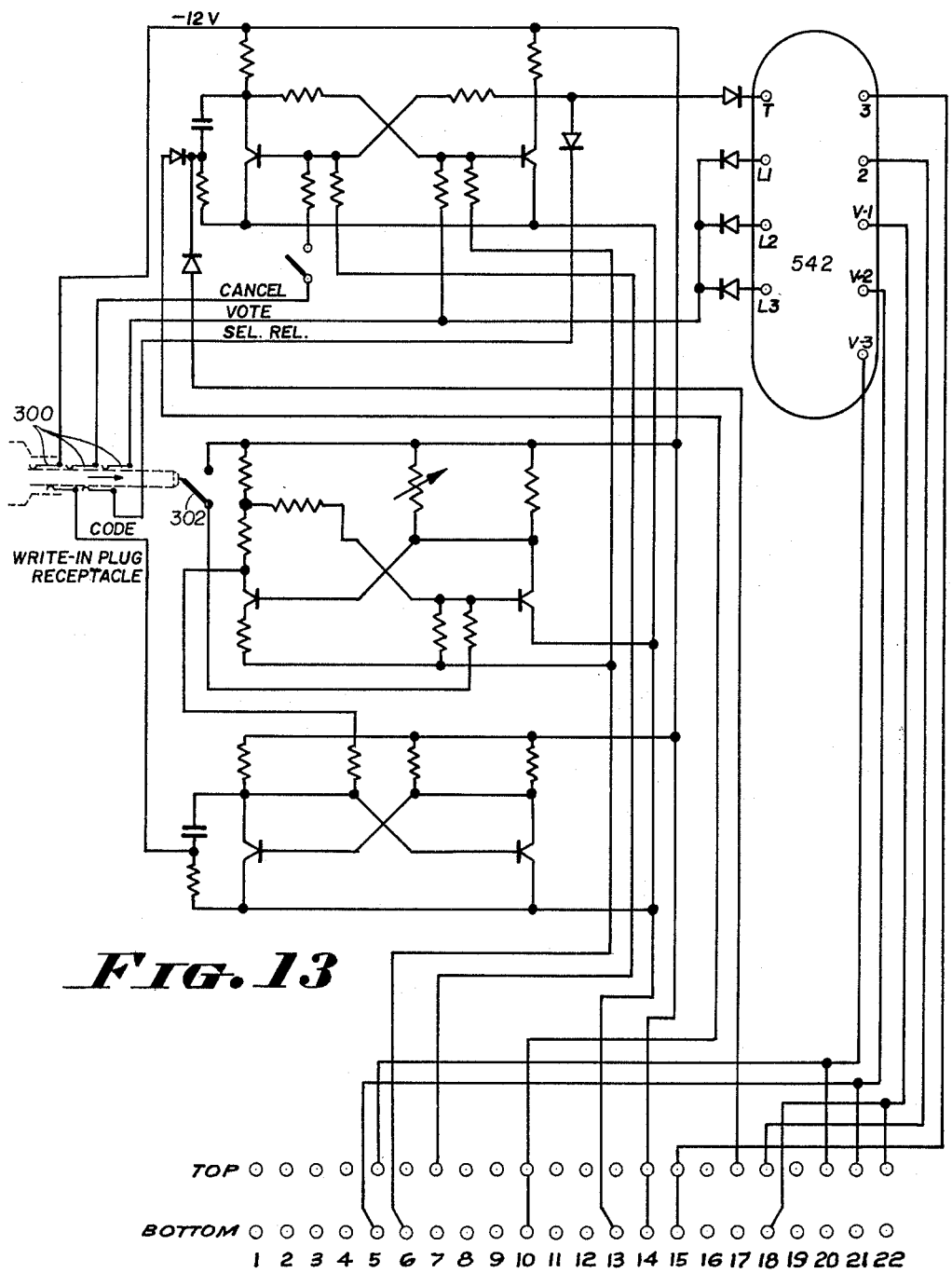
Figure 14:
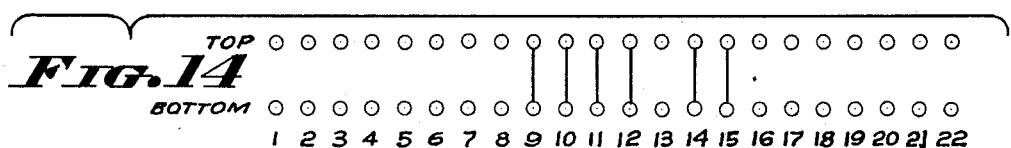
Figure 15:
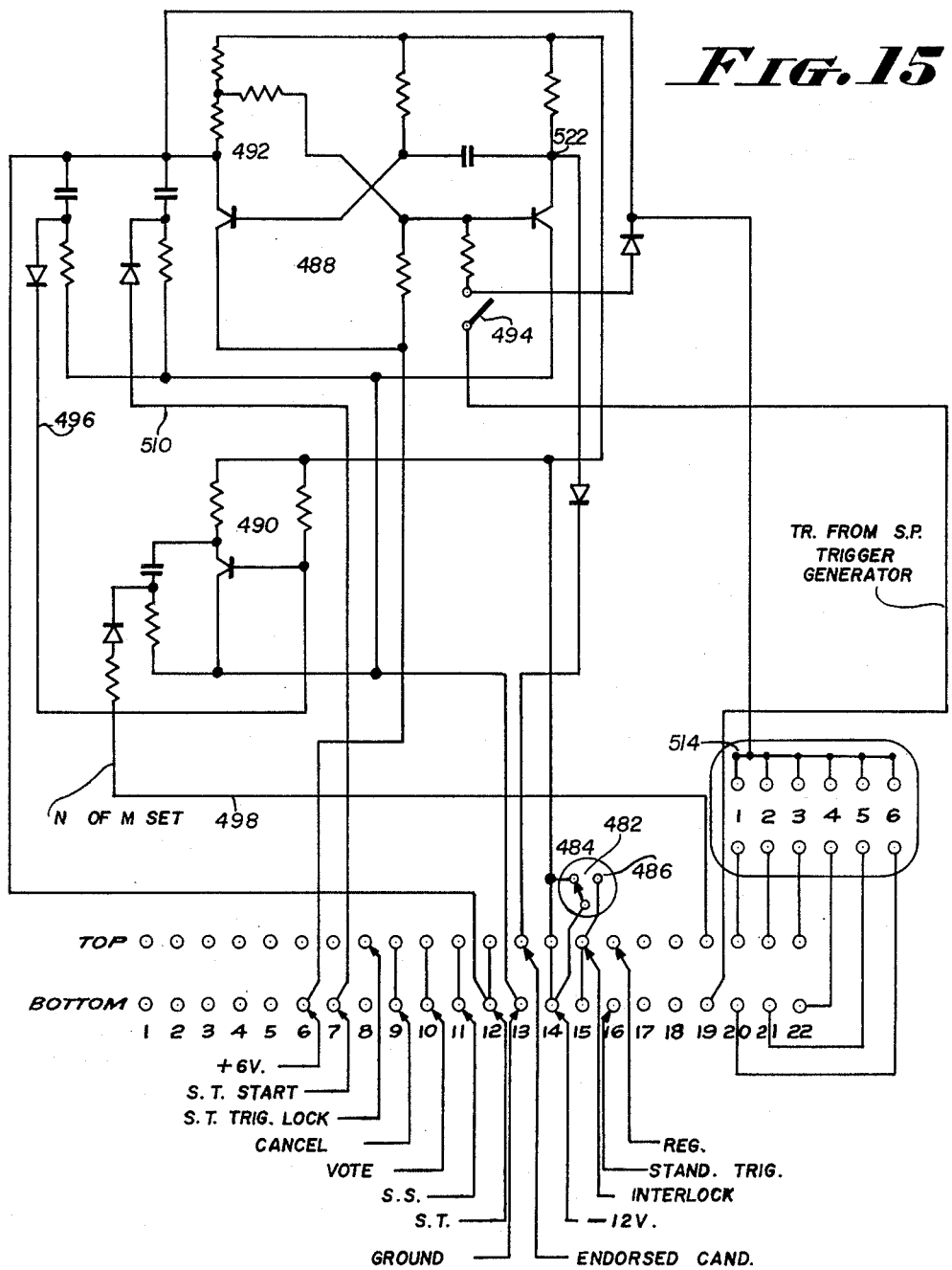
Figure 16:
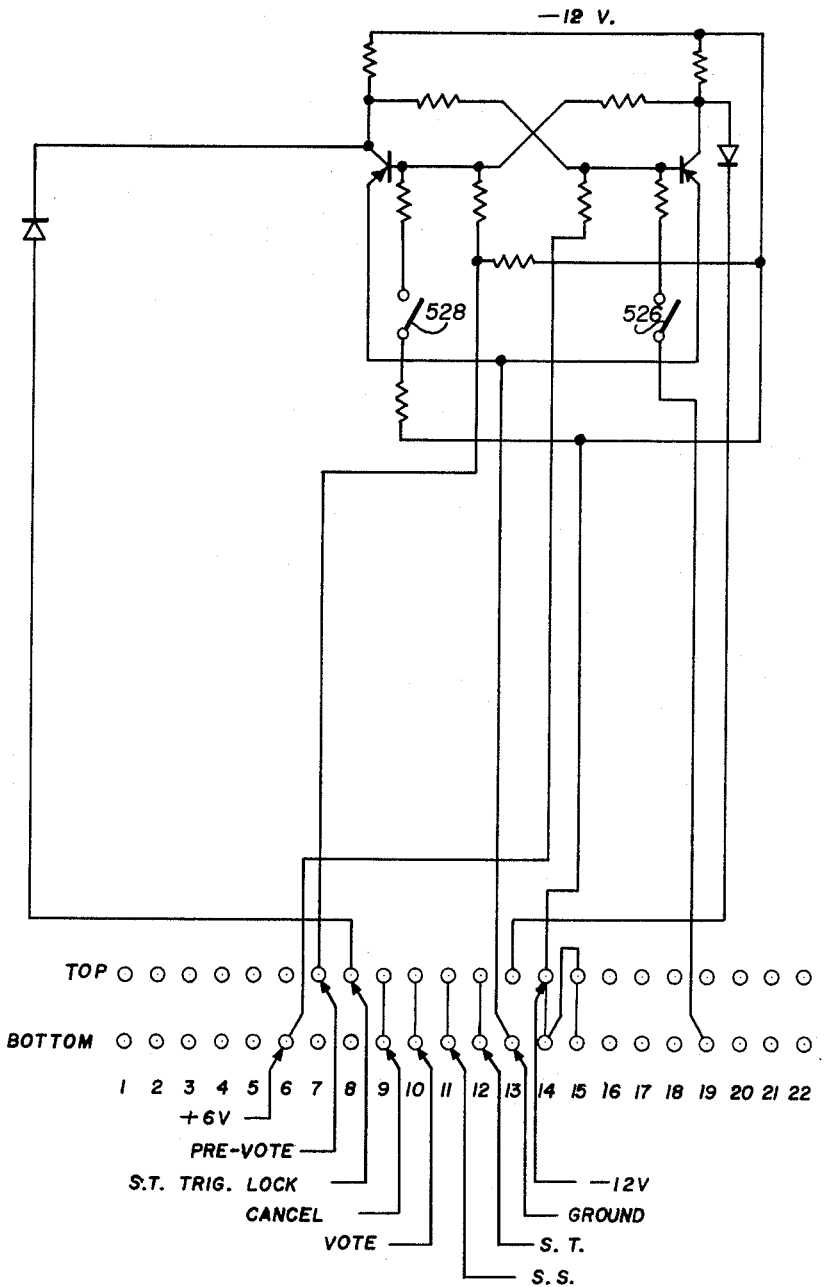
Figure 17:
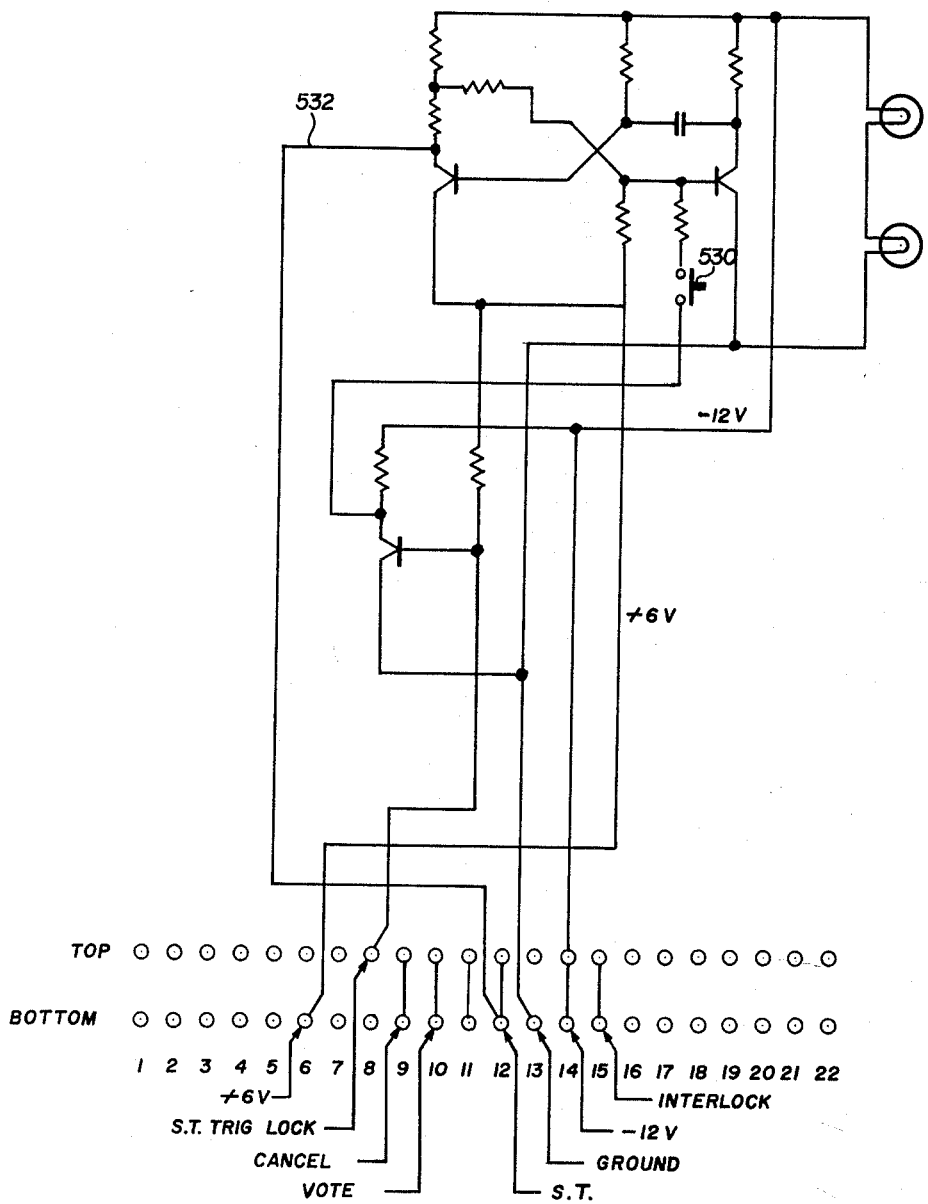
Figure 18:
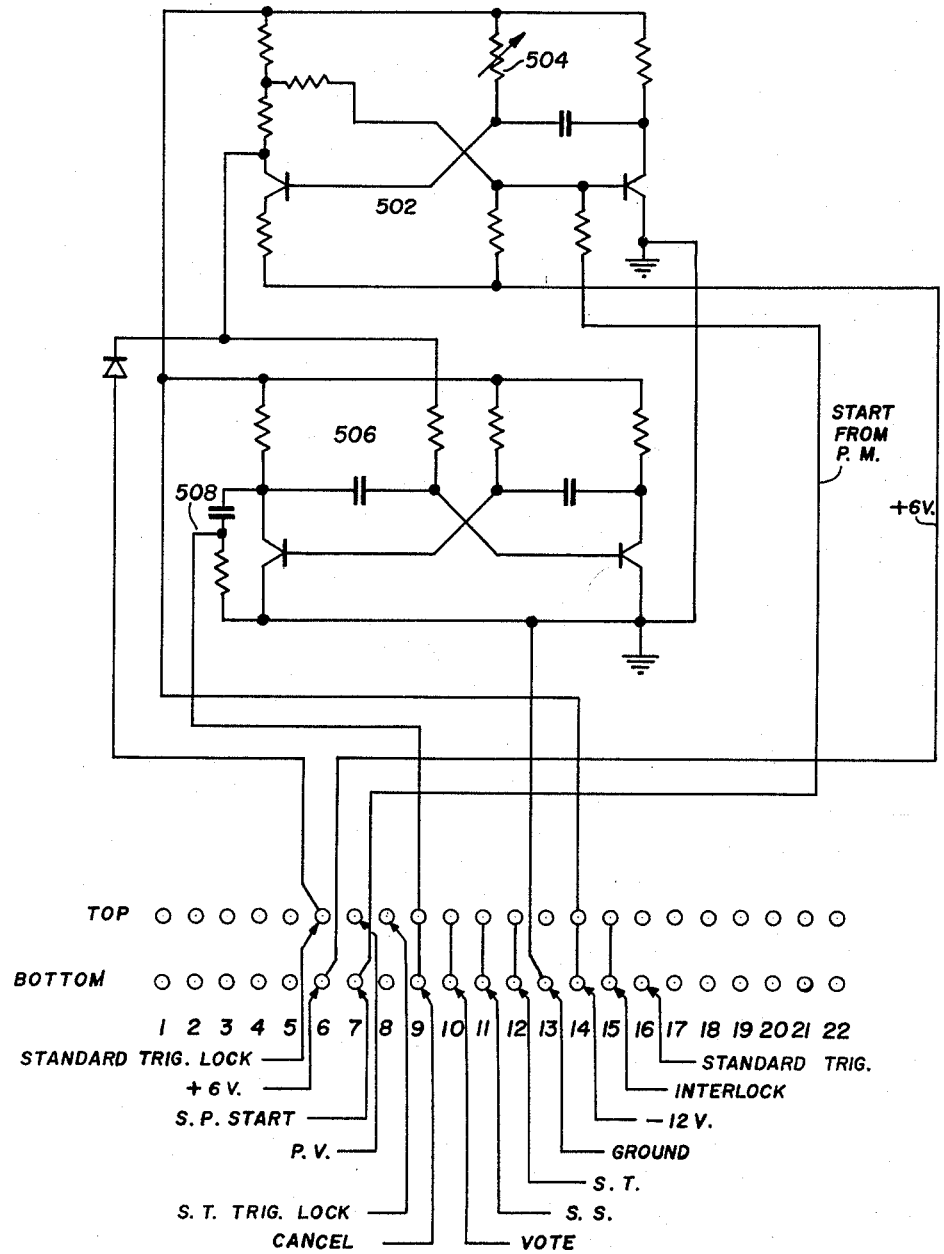
Figure 19:
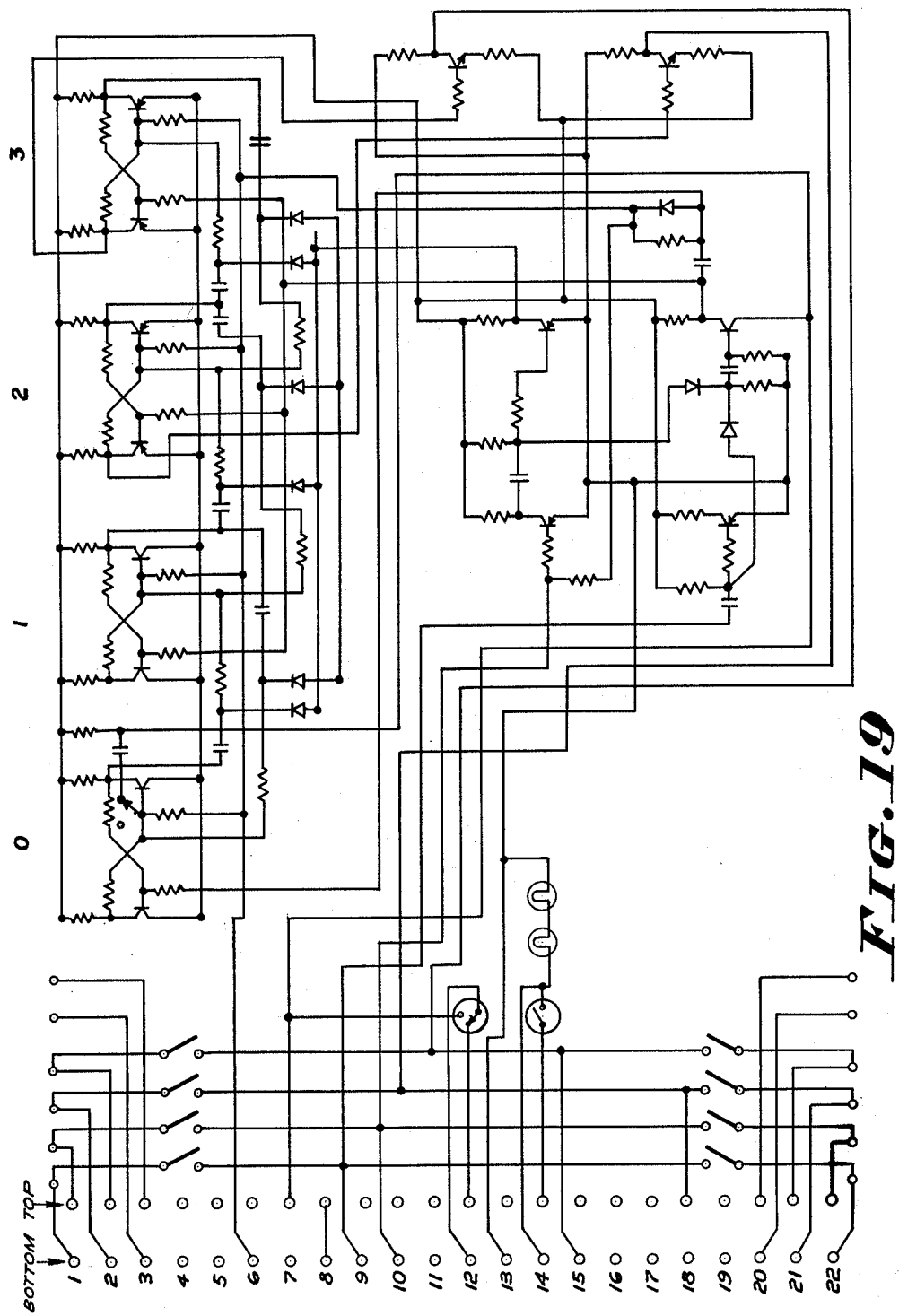
Figure 23:
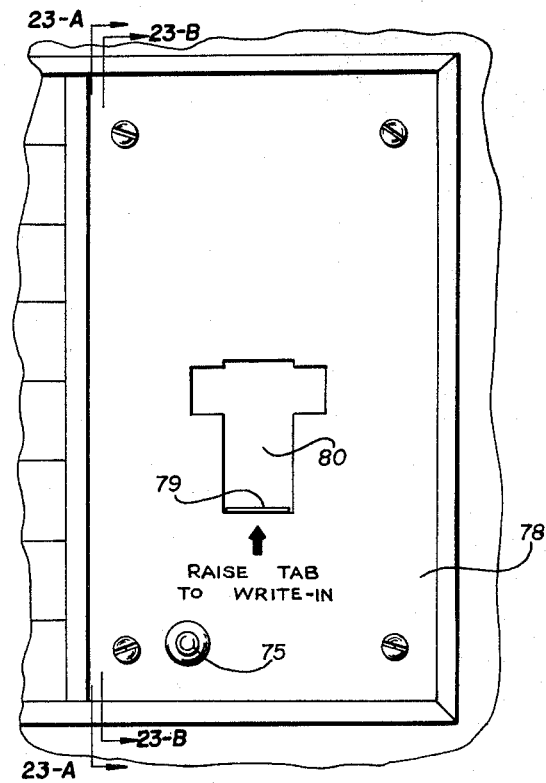
Figure 28:
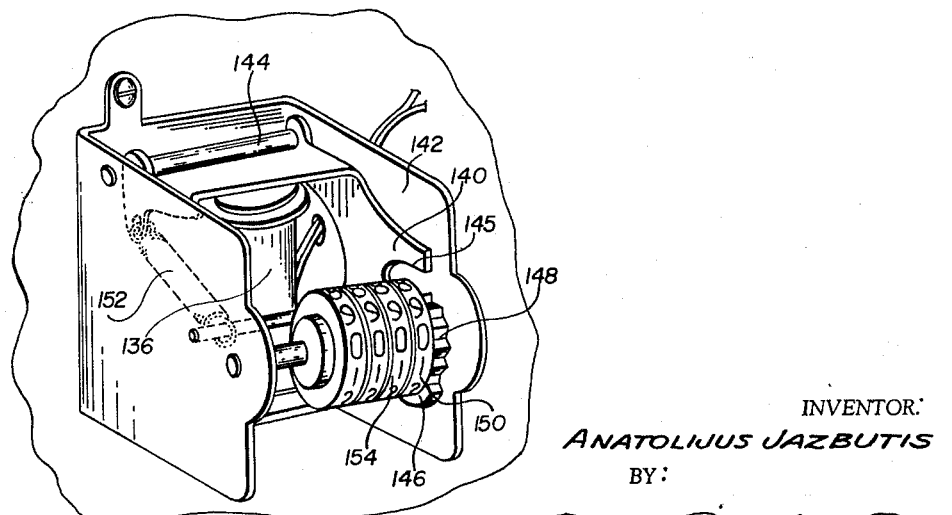
Figure 23A:
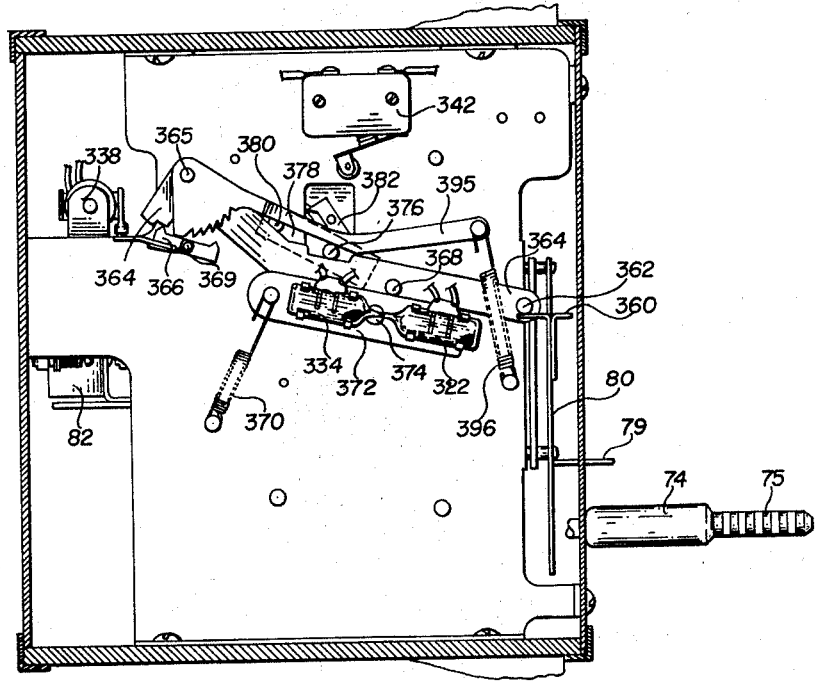
Figure 23B:
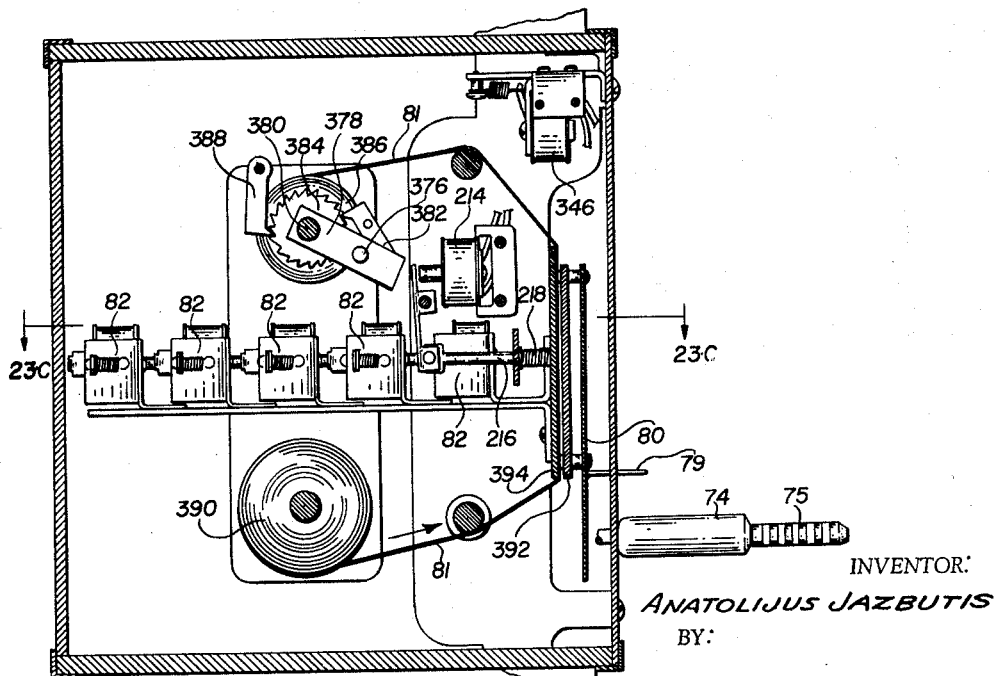
Figure 23C:
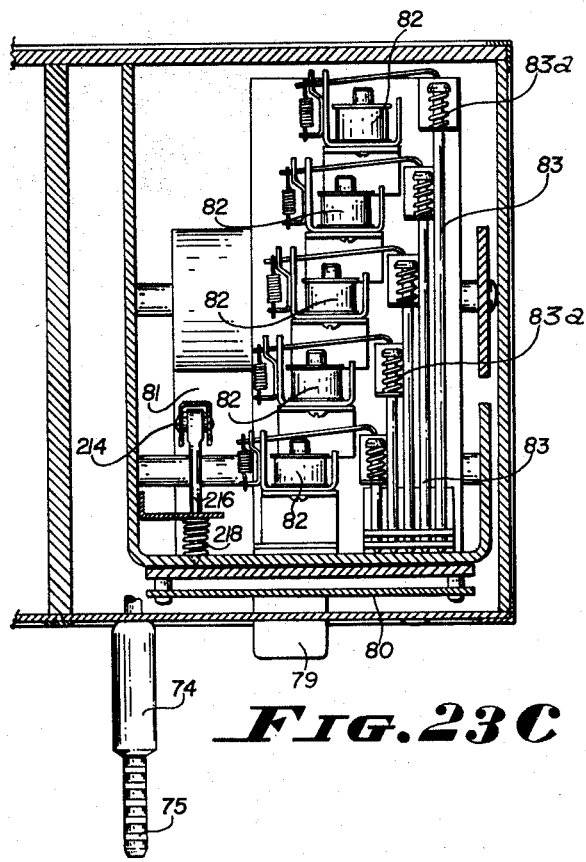
Figure 23D:
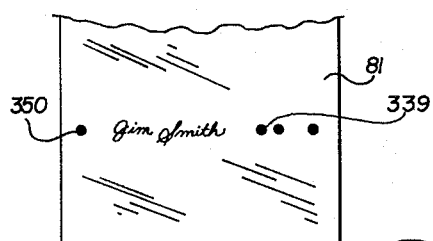

FIG. 12-A is a prespective view of a "write-in" module;

FIG. 13 is a schematic diagram of a write-in module as used in connection with an accumulator device, hereinafter referred to as a "W-Acc-Mod," as may be occasionally required by local law;

FIG. 14 is a schematic diagram of the circuitry required to cover an unused module space on the face of the voting unit;

FIG. 15 is a schematic diagram of one of the party module or "P-G'" components of the voting unit as used in general elections for straight ticket voting;

FIG. 16 is a schematic diagram of one of the party or "P-P" modules, as used in selective primary elections;

FIG. 17 is a schematic diagram of a straight office or "S-O" module as required for example in Massachusetts;

FIG. 18 is a schematic of one of the compensator or "C" modules of the unit;

FIG. 19 is a schematic diagram of one of the group office or "O-G-Acc" modules as used with accumulator device;

FIG. 20 is a schematic diagram of a standard or "S-Acc" module as used with an accumulator device;

FIG. 21 is a schematic of a single office or "O-S-Acc" module as used in the accumulator device;

FIG. 22 is an index to the receptacle pin assignments located on the backboard of the voting unit;

FIG. 23 is a close-up front view of a write-in area of the voting unit of FIG. 1;

FIGS. 23a and 23b are sections taken on lines 23a—23b, respectively, of FIG. 23;

FIG. 23c is a section taken on line 23c of FIG. 23b;

FIG. 23d is a view of a fragmentary portion of the paper tape record of a typical write-in vote, produced by the mechanism of FIG. 23c;

FIG. 24 is a schematic diagram of the circuitry asociated with the write-in area;

FIG. 24a is a diagram of the write-in window travel controls;

FIG. 25 is a fragmentary wiring schematic of the backboard panel of the voting unit;

FIG. 26 is a schematic of a plug-in unit used for straight ticket and selective primary type of ballots;

FIG. 27 is a schematic diagram of the scanner and register unit;

FIG. 28 is a perspective view of a typical electro-mechanical counter component of the register unit.

Figure 3:
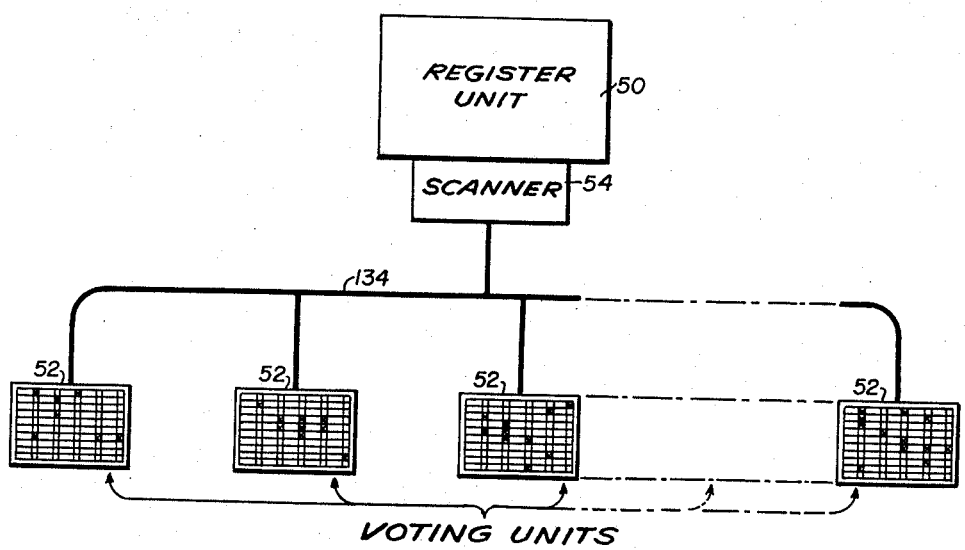
FIG. 3 is a block diagram of a voting system of the present invention, including representation of a series of voting units connected to a common register unit.
Figure 4:
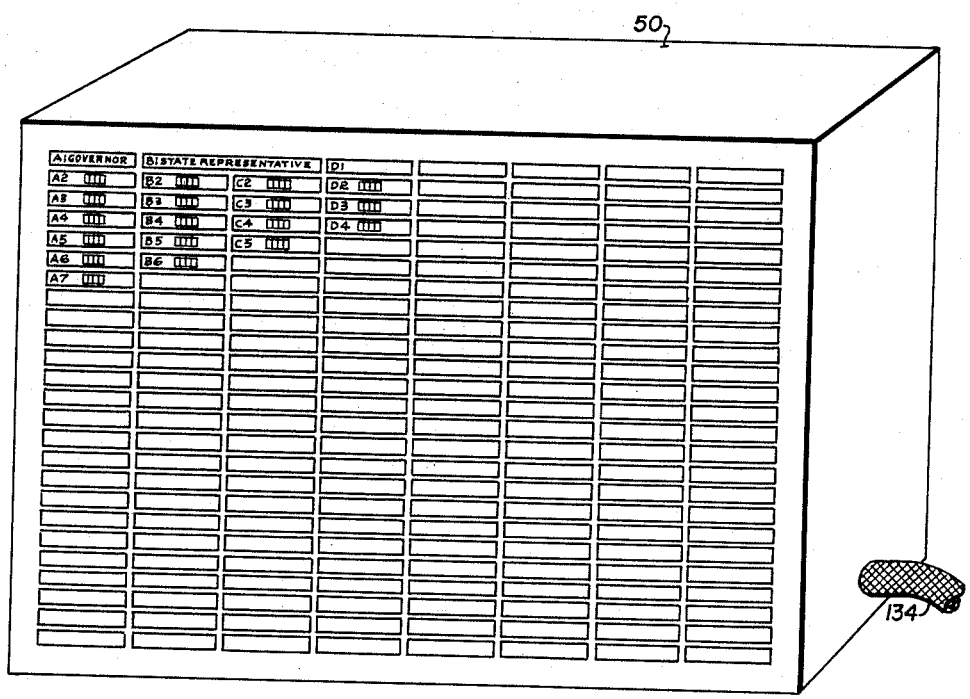
FIG. 4 is a front perspective view of the register unit component of the system showing typical accumulated voting tallies.

The present invention broadly contemplates provision of a voting system comprising essentially a single "central" register unit as indicated for example at 50 (FIGS. 3, 4, 4a, 5) into which a plurality of voting units as indicated at 52 (FIGS. 1, 2, 3) are electrically connected as indicated in FIG. 3; a scanner device as indicated at 54 being interposed between the voting units and the register unit. Whereas in FIG. 3 a group of four voting units are illustrated, it is to be understood that any other number of voting units may be employed, as may be necessary in connection with any given precinct requirements. Thus it will be appreciated that the separate voting units and the register unit may be disposed at separate locations, according to the environmental arrangements available at the polling place.

As shown in FIG. 1, each voting unit may for example comprise a cabinet-like casing as indicated at 56, the face of which presents to the view of the voter vertically arranged series of rectangular areas. As shown in better detail in FIG. 2, certain of the areas carry indicia designating the office for which the different candidates are competing. For example, as shown in FIG. 2, block A1 indicates that the candidates therebelow are running for governor; block A2 being indicated as representing the position of candidate "Smith"; block A3 representing the position of candidate "Jones"; and block A4 representing a "write-in" provision for this particular office, as will be explained more fully hereinafter. Block A5 carries the column designation "Senator" for example, and therebelow the candidates for that office are listed in blocks A6, A7 respectively.

Furthermore as shown in FIG. 2, wherever a relatively large number of candidates are competing for an office such as for State Representative as indicated at block B1; a multiple column arrangement of candidates may be employed. Thus for example as shown in FIG. 2 a dual column arrangement is shown to include blocks B2, B3, B4, and C2, C3, and C4 to accommodate the names of the five candidates as shown therein, as well as the "write-in" provision as shown at C4. Provisions for voting for other offices, as well as referendum questions, are of course indicated therebelow in FIG. 2, as will be apparent from the illustration.

Each voting unit contains mechanisms, which will be fully explained hereinafter, whereby whenever a voter makes the various selections available to him as explained hereinabove by pressing against the block carrying the candidate's name, his votes will be thereby temporarily stored in the voting unit. When each voter completes his selections, he manually depresses an exit button as indicated at 60 (FIGS. 1, 6) whereby a record of his votes is made available to the scanner device 54 for transmission to the central register unit 50, for permanent storage therein. As shown in FIG. 4A, the front panel portion of the register unit 50 is blocked off in simulation of the voting units as shown in FIG. 2; block designations A1, A2, B2, etc. being provided to correspond positionally and candidate-wise to the arrangements shown on the face of the voting units.

Each of the candidate blocks on the register unit as shown in FIG. 4A is formed with a transparent window device as indicated at 64, and behind each window is disposed a counter wheel stack revealing the accumulated vote tallies for the respective candidate. Thus for example as shown in FIG. 4A candidate Smith for governor has received a total of 1,357 votes. It will be appreciated that the counter devices disposed behind the office designation panels A1, A5, B1, etc. will be inactive. It will also be understood that the names of candidates appearing on "write-in" votes are unpredictable, and that the counter mechanism behind the block A4 for example on the register unit will show the total number of "write-in" votes accumulated for all of the "write-in" designatees, thereby providing a double check on the total number of votes cast against the total number of votes written on the paper "write-in" script.

As shown in FIG. 1, the cabinet 56 includes an election official's control panel 66 mounting a push button 68 which is depressed by the election official to "open" the machine to each incoming voter. When the unit is first plugged in to a power source a red light shows as indicated at 70 to indicate that the machine is "ready" but is still closed against voting. As each voter approaches, the official presses push button 68 which applies the power to the voter control button 72. Incidentally, the red light 70 is deenergized and in lieu thereof a green light 77 shows, to indicate that the machine is now "open" to operation by the voter.

The voter now "opens" the machine for his vote selections, by simply pressing the push button 72 which causes the associated circuitry of the voting unit to be energized, and incidentally causes lamps disposed behind the authorized voting blocks or modules (FIG. 2) to be illuminated. Thus, the voter has a clear view of his available selections, and any areas of voting selections not intended to be available to that particular voter will remain unilluminated and deenergized. The voter then proceeds to depress the "name" button portion of the candidate modules corresponding to his intended selections, thereby closing circuits causing his selections to be temporarily stored within the voting unit, as will be explained hereinafter. Incidentally thereto, electric lamps behind the "X" button portions associated with the selected modules will be energized, thereby visually indicating to the voter the selections made. In event the voter wishes to change any selection, this may be accomplished by simply pressing the "X" button of the unwanted module which will result in cancelling the previously stored selection and deenergizing the lamp behind that "X" button.

In the event the voter wishes to "write-in" a vote he pulls out an extension cord as indicated at 74 having a plug-in terminal 75, and plugs the latter into a receptacle as indicated at 76 (FIGS. 1, 2) of the appropriate "write-in" block in the column for the office he desires to record a "write-in" vote. This operation releases an electrical code which is generated in the "write-in" block or module such as indicated for example at A4 in FIG. 2; this code being then electrically transmitted to "write-in" area 78 (FIG. 1) thereby setting up a code read-out mechanism located behind the "write-in" area 78. The voter then raises a sliding door 80 thereby exposing to view a paper tape 81 (FIGS. 23, a, b, c) upon which the voter may write the name of the person for whom he wishes to vote. Incidental to raising of the door 80 by the voter, the code marking mechanism comprising a series of magnetic actuators 82 (FIGS. 23, b, c) behind the "write-in" area is operated to cause appropriately selected rods 83 to perforate the tape in association with the "write-in" name, as shown in FIG. 23d, thereby identifying the office for which the "write-in" name was intended.

At the completion of the voter's selections, he depresses the exit button 60 thereby closing circuitry within the unit permitting the scanner 54 to transmit the temporarily stored vote selections to the registration unit 50. Incidental thereto the circuitry controlling the temporary storage of vote selections will be cleared, in preparation for the next voting cycle. Preferably, to provide secrecy for the voting operation, a movable curtain arrangement (not shown) will be provided to encircle the voting unit, and will be automatically controlled to close behind the incoming voter incidental to his depressing of the opening control button 72. Then, upon the voter's actuation of the exit button 60, the curtain control system will be actuated so as to automatically open the curtain, facilitating his exit from the machine.

To enable the election official to adjust the voting unit to meet different election situations, such as for example to distinguish between parties in connection with open primary elections, a control knob as indicated at 84 is provided to be available to the election official, which upon turning to certain positions will cause the appropriate portions of the voting panel to be energized. Another control knob as indicated at 85 is also made available to the election officer whereby he may control the release of certain areas of the voting panel for different groups of voters; such as for example in the case of different school district, etc.

Each voting block or module as shown in FIGS. 1 and 2, and as are designated for example as A2, A3, etc., actually comprises a module unit wherein the main front panel portion 86 comprises a depressible button, and as shown in FIG. 7, the button is formed of transparent material and encloses a translucent election ballot name card 90 which is thereby carried within a transparent block 92 which is mounted by means of a pair of scissors link devices 94—94 based upon stationary brackets 96 which extend vertically from a front chassis 98. The chassis 98 includes an upright front frame portion 99 which surrounds the movable block 92, as well as a movably mounted "X" button 100. The block 92 and the button 100 are both spring-loaded and are thus mounted relative to the chassis 98 to be movable thereon. Thus, the buttons 92 and 100 are displaceable inwardly by application of manual pressures thereagainst relative to the chassis front frame 99, by the voter as explained hereinabove. The scissors link and slide guide devices cause the buttons to move without twisting regardless of the point of pressure applications thereagainst.

As shown in FIG. 7, a bracket 104 extending rearwardly from the block 92, engages with a rotational connection as indicated at 106 with a spiral ribbon shaped thrust bar 108. The ribbon bar 108 passes through parallel guide pin 110, whereby axial displacements of the bar 108 relative to the guide pins 110, as caused by inward displacements of the push button 92, will cause the inner end of the bar 108 to rotate. A mercury switch tube 112 is mounted at the rotating end of the bar 108, and thus it will be understood that simple push motions against the button 92 will cause the mercury switch tube to tilt, and the parts are so arranged that such tiltings of the mercury switch tube will cause the switch to close. Upon release of the button 92, a compression spring 114 returns the mechanism to its original position, whereby the switch 112 will be returned to its "open" position. The "X" button 100 similarly connects through a "twist bar" to a mercury switch 115 (FIG. 7) and therefor operates in similar fashion.

In the case of each module, the front chassis 98 is mounted to extend forwardly from a printed circuit board 116 which in each case will contain appropriate circuitry, as required for the specific use to which the module will be applied, and which will be explained more fully hereinafter. At the rear end of each circuit board it terminates in a series of spaced parallel contacts as indicated at 117. A circuit board receptacle as indicated at 118 slip fits over the inner end portion of the board 116, and includes contact members 119 which are thereby electrically coupled with the terminal contacts 117 of the printed circuit board 116. The conductors 119 in turn couple the connected circuits to the circuitry of the voting unit, as will be explained hereinafter.

The module construction of FIG. 7 applies only to the so called "standard module," and the circuitry called for in this type module is shown schematically in the drawing herein at FIG. 9 wherein the mercury switches 112 and 115 (voting and cancelling switches respectively). As shown in FIG. 9 the contact terminals 117 may be conveniently arranged both on the top and bottom surfaces of the circuit board 116, in order to conserve space and reduce the physical size of the circuit board. Electrical lamps as indicated at 120-122 are mounted behind the buttons 86 and 100 respectively.

The circuitry of FIG. 9 provides a bistable multivibrator, capable of fully storing therein the selection of the voter when he presses the name button 86. Also the circuitry includes means whereby upon depression of the button 100 the previously stored selection will be cancelled, and the circuit restored to its original condition. Thus, as shown the circuitry includes transistors 124, 126 which alternatively conduct electrical current. The transistor 124 is arranged to be conductive before the voter presses the button 86, and the circuitry is arranged that upon closing of the mercury switch 112 the transistor 124 will stop conducting and the transistor 126 will conduct, thereby causing lamp 122 to be energized. More specifically, when switch 112 is closed, a negative voltage of −12 volts is supplied from the main control unit trigger generator as indicated at 128 (FIGS. 5, 6A) and transmitted through connector B16 (bottom row-pin #16, FIG. 9) and to the base of transistor 126, thereby forcing it to conduct. Due to feed back action this will stop the conduction of transistor 124. Thus, the collector 130 of the transistor 126 will assume a substantially zero voltage, and collector 132 of the transistor 124 assumes essentially —12 volts, thereby initiating a temporary storage of the vote selection, as explained hereinabove.

It will be seen from FIG. 9 that point 130 is connected through a diode 133 to connector contact point T16 (FIG. 9) which is electrically connected by means of the receptacle in and interconnecting conductors 134 (FIG. 3) to point 138 (FIG. 27), thereby providing a ground return through transistor 126 (FIG. 9) to the corresponding counter coil 136 in the register unit 50. The circuitry in conjunction with the exit button 60 and the scanner 54 is so arranged that upon depression of button 60, —12 volts will be supplied to the other ends 139 of the counter coils 136, thereby energizing the coil 136 and causing the appropriate counter to add a count of one to its previously accumulated tally.

As shown in FIG. 28 a typically suitable form of counter will comprise in addition to the coil 136 an armature 140 hinged to a stationary bracket 142 as indicated at 144. The armature is formed with opposed ratchet arms 145, 146 which engage in camming relation with a ratchet wheel 148 keyed to the unit counter wheel 150. The armature is biased by a spring 152 towards an up position. Thus, when the coil 136 is energized the armature 140 is pulled down against the spring and the arms 145 cams the wheel 148 to rotate the counter wheel 150 through an angle equal to one-half of a unit count. Upon deenergization of the coil the spring returns the armature, causing the arm 146 to similarly cam the ratchet wheel through another equal angle, thus completing advance of the unit counter wheel by a count of one. As is well known in the art, after the unit counter wheel travels through a complete revolution it causes the tens counter wheel 154 to advance one count, and so on. As explained hereinabove, the counter wheel stacks are mounted in the register unit 50 so that the accumulated counter wheel tallies appear at the windows 64 at the front panel of the unit 50, for either visual reading or printing record purposes; or in lieu thereof the counter wheels may each be arranged to contain an electrical transducer, such as for example, a potentiometer providing electrical signals corresponding to the accumulated count in each counter for telemetering the results to a central accumulating station.

As previously stated, the election official's opening control circuitry, which is indicated generally at 160 (FIGS. 5, 6) includes an official's opening button 68 (FIGS. 1, 6) and signal lights 70, 77. When button 68 is depressed the light 70 goes out and lamp 77 lights up, thus indicating that the machine is "ready" for the voter. This operation is performed in preparation for each voter. As shown in FIG. 6, the circuitry is arranged so that depression of control button 68 closes a relay 162 whereby it locks itself in energized position closing a circuit through contact 164. Also, contact 166 of the same relay thereupon closes and provides energization of the lamp 74 and lamp 168, which are disposed behind the voters opening switch push button 72 (FIG. 1). Thus the machine is now ready for a voter, as explained hereinabove.

As the voter approaches the machine he initially depresses push button 72 (FIG. 6) whereby the relay 170 is energized and locks itself into position closing a circuit through contacts 172. Simultaneously contact 174 will close, whereby lamps 168 and 77 will be deenergized, and a lamp 176 disposed behind the exit button 60 will be illuminated. Thus, by virtue of the closing of the relays 162, 170 the power supply will now be connected into the official's control switches 84, 85 which as explained hereinabove have been previously set by the election official to transmit power to the appropriate areas of the voting unit face corresponding to each voter's privileges in making his selections.

To insure that upon application of power to the voting modules the transistors 124 are conducting, a pre-vote set signal is arranged to be applied to the bi-stable multivibrators of the machine. This is accomplished by the arrangement as shown in FIG. 6 whereby upon application of negative voltage at the point 178 as explained hereinabove, a negative pulse will be generated at point 180 which will force transistor 182 to conduct, thereby energizing relay 186. This opens the contact 188, interrupting the bias voltage which is normally connected to the contact T11 (FIG. 9) and thereby forcing transistor 124 to conduct. Simultaneously, the contact 190 opens, thereby interrupting the bias voltage to the transistor 184, forcing the latter to conduct. This forces transistor 182 to stop conducting, and thereby deenergizes relay 186, restoring the circuit to its initial condition. By virtue of this arrangement it is ensured that all of the transistors 124 in the candidate modules, prior to being voted, are conducting. Hence, the machine will now be "set" in condition to receive the voter's multiple selections. After his selections are completed, as explained hereinabove, the voter depresses the exit button 60 to cause the curtain to be withdrawn prior to his leaving the machine. To preclude inadvertent loss of his votes, such as by unintended cancelling thereof, the equipment is arranged so that the exit button 60 will be ineffective unless at least one selection is made. This is accomplished by supplying a closing voltage to the switch 60 this voltage being normally supplied by a "machine release" circuit 192 (FIG. 6A) which includes a "machine release" transistor 194 and a write-in memory circuit consisting of transistors 196, 198 and associated components.

The closing voltage is supplied by transistor 194 to point 200 (FIGS. 6, 6A); and thus before any voting selection is made the point 200 will be at ground potential. As shown in FIG. 6A, the circuitry is arranged so that the machine release can be effected in two different ways. First by voting for any candidate whereby the point 202 (FIG. 6A) which is electrically connected to point T8 (FIG. 9) will receive a negative voltage and thereby force transistor 194 to conduct and hence point 200 will then carry a negative voltage which is available to the exit switch 60. Secondly, the machine release can be effected by any write-in voting which through point 204 (FIG. 6A) is electrically connected to point T17 (FIG. 12) and will force transistor 196 to stop conducting. Hence point 206 will then develop a negative voltage which in turn will force transistor 194 to conduct, thereby providing machine release voltage at point 200.

Upon actuation of push button switch 60 the relay 208 (FIG. 6) will be energized thereby closing contact 210. The relay self locks to contact closed position, thereby eliminating the negative voltage to provide the vote closing signal at point 212 (FIGS. 6, 24). This deenergizes the voter separating solenoid 214 (FIGS. 24, 23C) thereby causing punch rod 216 to move in response to the forces of compression spring 218 (FIGS. 23B, 23C) to the right as viewed in FIG. 23B, thereby perforating the paper tape 81 behind the write-in area. The punch rod 216 remains in this position until the next voting cycle begins whereupon manual depression of buttons 68, 72, operating through contact 10 re-energizes the solenoid 214, causing the punch rod 216 to be retracted clear of the tape.

Incidentally, depression of the button 60 also supplies a negative voltage at point 220 (FIG. 6) which is electrically connected to point B17 (FIG. 11), thereby supplying single shot interrogating voltage to transistor 222 (FIG. 11) thereby making point 224 negative, which in turn will cause certain votes to be canceled if the voter attempts to register votes of a nature prohibited to him under the applicable law. This reference is made to voting procedures sometimes termed in the art as "anti-single-shot" voting requirements.

Upon release of the push button 60, it returns to the condition shown in FIG. 6 and thereby supplies a negative energizing voltage to relay 226, thereby closing contacts 228 and 230. The relay will lock itself through the contact 228. The contact 230 will then provide a negative voltage to the scanner through point 232 (FIGS. 6, 27) thereby making the vote selections available for scanner to transfer them to the register unit. The scanner device as shown in FIG. 27 includes a free-running oscillator 234 which will provide a continuous series of pulses which are transmitted to and counted by a ring counter as indicated at 236. Each stage of the ring counter is assignable to one voting unit of the group sharing a common register.

The ring counter is being scanned constantly by the oscillator 234 throughout the voting day. As mentioned hereinabove development of negative voltage at point 232 will force transistor 234 to conduct. Considering now for example the operation of voting unit No. 1 (FIG. 27) when the transistor 234 is conducting the relay 236 will be deenergized and contact 238 will be open. When the oscillator scanning transfers from unit VU–N to unit VU–1 a negative pulse will be developed and applied to the base of transistor 240 thereby forcing this transistor to conduct provided the negative voltage at point 232 has been previously applied. Simultaneously, the contact 238 is closed and will provide a negative voltage supplying the counter coils 136. A previously voted circuit as explained hereinabove, will provide ground returns for the appropriate counters whereby those counters will be energized and advanced by a count of one.

To insure that the time cycle specified by the frequency of running oscillator 234 is fully available for counter coil actuation, provision is made so that the voltage developed at point 232 must occur before the scanner pulse transfers from VU–N to VU–1, in order that the stored votes will be recorded. In the event that the pulse transfer precedes the development of the voltage at point 232 the information will not be picked up by the scanner on the round of its cycle, but will be recorded on the next cycle of the scan. However, in any case this delay in vote collection will not exceed the order of one second, which will not cause inconvenience to the voter.

In order to restore the voting unit to its original condition after being reviewed by the scanner, a time delay 242 is arranged to be energized through the contact 238 after a prescribed time delay of sufficient duration to allow for actuation of the counters as explained hereinabove. After this time delay the relay 242 will energize and open the contact 244 which interrupts the electrical continuity between the points 246, 248 (FIG. 6) thereby unlocking relay 162. This in turn switches off the power to the equipment beyond the official's controls, and restores the voting unit to receive the next operating cycle. Thus it will be appreciated that the system of the present invention provides a device of optimum versatility with respect to the sharing of a "central" vote register device by a plurality of voting units.

Figure 10:
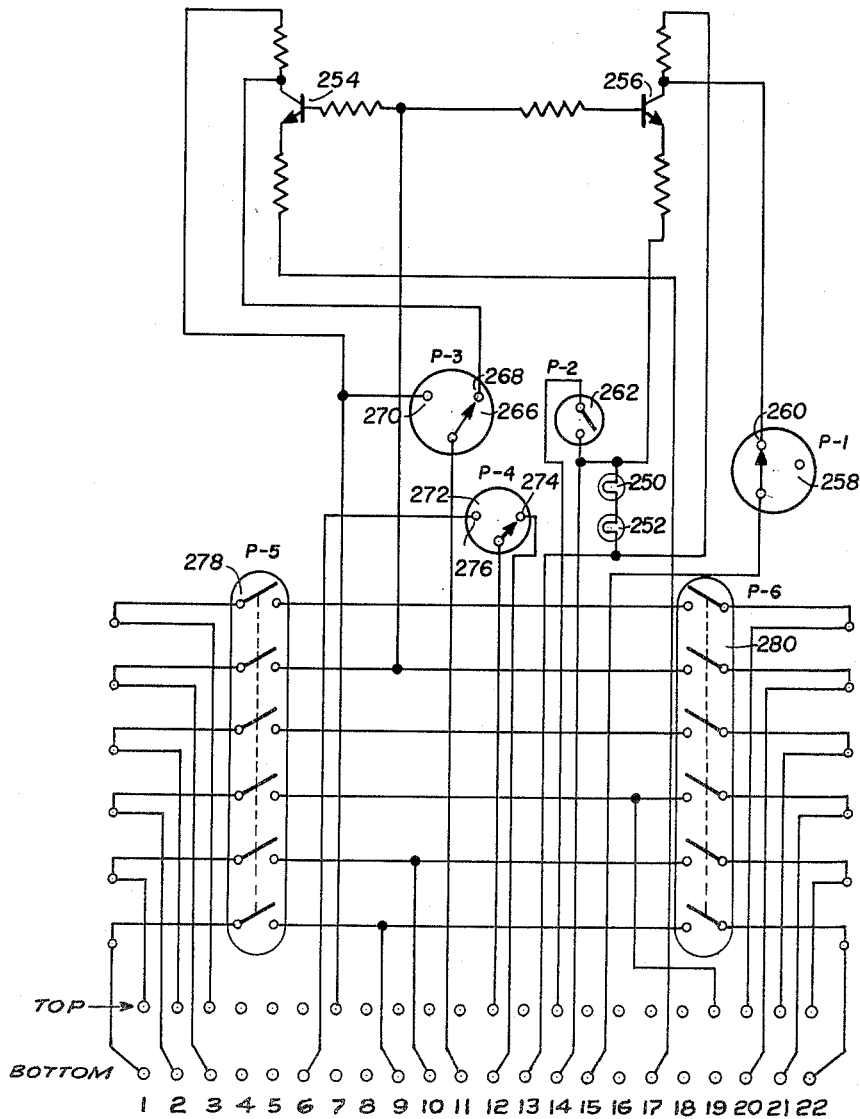
FIG. 10 is a schematic diagram of a so-called "single office" or "O-S" type module.

As stated hereinabove, each voting unit presents a voting face comprising vertically and horizontally aligned rows of openings into which may be slip-fitted different types of individual modules, thereby building up in blocks a ballot format as prescribed by any voting situation. Thus the voting face may be arranged in any given case to resemble any conventionally known paper ballot type format. For example as shown in FIG. 2, blocks A1, A2, A3, A4 may present an arrangement which is typical of a "vote for one" (single) office; whereas blocks B1, B2, B3, B4, C1, C2, C3, C4 represent a typical "vote for three" (group office) arrangement. The single office area will in this case include a "single office module" (O-S); a number of candidate modules as required; and a "write-in" module if required. For example, block A1 of FIG. 2 represents the front of a single office module (O-S), the schematic diagram for which is shown at FIG. 10. Blocks A2, A3 are occupied by standard-candidate (S-Mod.) type modules such as are illustrated for example at FIG. 7; typical circuitry therefore being schematically at FIG. 9. The area indicated at A4 in FIG. 2 is occupied by a write-in module; the circuitry for which is schematically shown at FIG. 12.

As stated hereinabove, the modules are adapted to be to be slip-fitted into appropriate openings in the front panel of the voting unit in such manner that their contacts 117 at their rear ends in connection with the printed circuitry carried by the boards will slide fit into electrical connections with conductors 119 carried by appropriate receptacles 118 which are supported upon the back board of the voting unit at positions in registry with the rear ends of the modules. Thus, it will be appreciated that the back board portion of the voting unit will be equipped with receptacles 118 in alignment with each opening in the front panel of the voting unit. These receptacles are electrically interconnected with each other and with the voting unit control circuitry as illustarted schematically in FIG. 25 which illustrates the receptacle interconnections only fragmentarily; FIG. 25 illustrating only three receptacle sets of connections of one column and three sets of receptacle connections partially shown of another column.

The functions applying to the individual contacts of the receptacles showing in FIG. 25 are tabulated in FIG. 22. For example, the notation at T5 means contact No. 5 located on the top surface of module printed circuit board, and the notation B7 means contact No. 7 on the bottom of the module board. FIGS. 6 and 6A illustrate typical interconnections to the back board receptacle points.

Upon "opening" of the machine by the voter as explained hereinabove, power is thereby supplied through switch 84 through the back board circuitry and receptacle contacts to contact T14 (FIG. 10) on all of the modules that are plugged into the front panel of the voting unit. As shown in FIG. 10, each single office module includes a pair of back up lights 250, 252 disposed behind the office, title designation or eliminating the same. The circuitry also includes an "anti-single-shot" transistor 254, and an interlock tarnsistor 256, the functions of which will be explained in detail hereinafter. Also, the circuitry includes a number of programming points. For example, 258 indicates an off-on switch or jumper which when adjusted to close contact 260 will provide circuitry meeting "group office" requirements. When the switch 258 is opened, the circuitry will meet "single office" requirements. Programming point 262 comprises another off-on switch which when closed supplies power from the above portion of the column, and which when opened will supply the power from any auxiliary contacts originated upon adjustment by the election official of the area control switch 85. For example, as shown in FIG. 25, a jumper 264 is indicated as connecting a power carrying line to the pin B14. Programming point 266 comprises a single pole double-throw switch which in the position of the adjustment shown in FIG. 10 closes contact 268 and will provide the circuitry requirements meeting "anti-single-shot" provisions. When adjusted to close contact 270, a circuit will be furnished omitting the single shot arrangement. Programming point 272 also comprises a single pole double-throw switch which when adjusted to close contact 274 will supply a circuit meeting straight ticket vote requirement. When adjusted to close contact 276, the circuitry will be arranged for individual voting Programming points 278, 280, each comprising in effect a six pole double-throw switch are used to interconnect two or more parallel columns on the front panel if these columns are to be used for the same office area. The functions of these programming devices will be more fully explained hereinafter.

Again, referring for example to the single office arrangement shown in areas A1, A2, A3, A4 at FIG. 2, when programming point 258 will be moved to its open position; the programming switch 262 will be moved to its closed position; the programming switch 266 will be moved to close contact 270; and the programming switch 272 will be moved to close contact 276. This programming arrangement will completely exclude the transistor circuitry shown at the top portion of FIG. 10. Also, in this particular case the programming switches 278, 280 will be left in their open positions as shown in FIG. 10.

Referring again to FIG. 9 which illustrates schematically a standard-candidate module (S-Mod.) circuitry, it will be noted that a single programming point 282 is provided in the form of a single pole double-throw contact switch. The circuit is so arranged that when contact 284 is closed the system will meet single office requirements; and when contact 286 is closed the system will meet group office requirements. As illustrated in FIG. 2, at areas 1A, 2A, 3A, 4A, in this case the programming point will be adjusted to close contact 284. As previously stated, when the voting switch 112 is closed by depression of the button 86, the transistor 126 starts conducting and forces the point 130 to assume substantially ground potential. As shown at FIG. 25, the contact points T15 of each of the modules, in A2, A3 and A4 positions, are interconnected to each other. Whenever either module is voted as explained hereinabove, substantially ground potential at point 130 (FIG. 9) will be transmitted through diode 288 and switch 282 to a common contact T15. If the voter then attempts to vote another candidate for the same office, by depressing another module's vote switch 112 a standard trigger having negative potential will be shorted to ground through diode 290 and then through programming switch 282 into the common contact T15 and through the already conducting transistor 126. Thus the negative trigger voltage will become ineffective and will fail to force transistor 126 into conduction; and hence no additional vote will be stored.

Figure 12A:
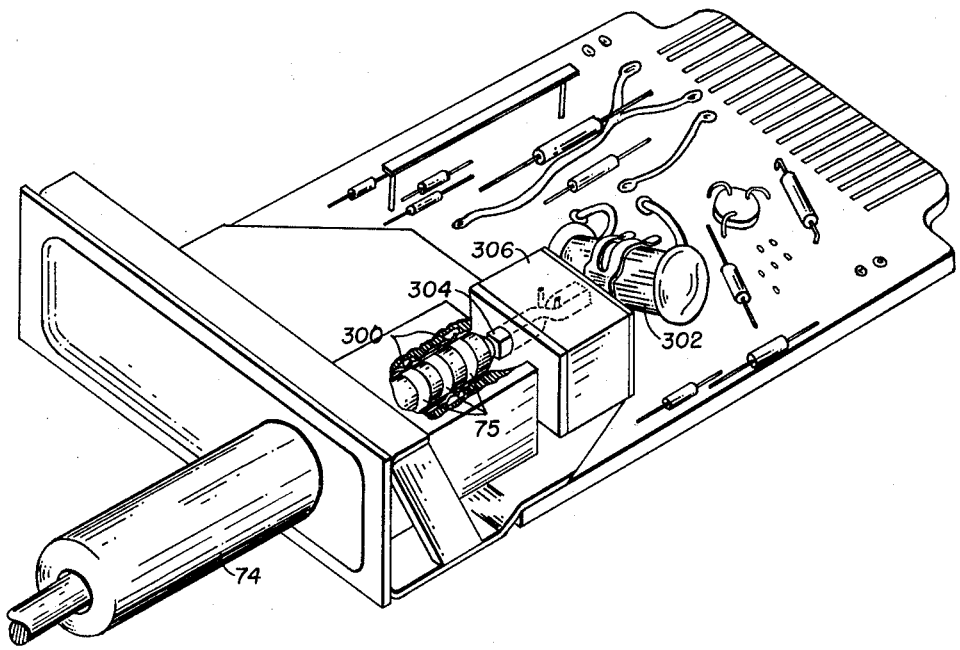

As previously stated, in order to make a write-in vote, the voter first withdraws extension cord 174 from the write-in area 78 (FIG. 1) and inserts plug 75 into the receptacle of the appropriate write-in module, as shown for example at 76 in FIG. 2. The voter then lifts the door 80 to expose the paper tape upon which he may then write in the name of his candidate. The plug-in action interconnects the plug contacts 75 (FIG. 24) into electrical connections with receptacle contacts 300 as shown in FIGS. 12 and 12A. FIG. 12 illustrates schematically the circuitry of a typical write-in module. FIG. 24 is a schematic illustration of the write-in area associated with the write-in window 78. A mercury switch 302 is mounted upon the write-in module (FIGS. 12, 12A), and is arranged to be tilted into circuit closing position by means of a mounting screw 304 which slides within a mounting block 306; the parts being so dimensioned and arranged that the mercury switch is tilted only at the end of the plug-in travel of the connector member 75. This generates a negative pulse.

The circuitry of the write-in module as illustrated at FIG. 12, includes transistor 308, 310 and associated components; this portion of the circuit being generally similar to the candidate module circuitry as shown schematically at FIG. 9; and hence provides a similar function. In addition, the circuitry includes a portion 312 comprising a bi-stable multivibrator, which when energized by the negative pulse from the plug-in action will supply a negative voltage to point 316 forcing a previously monostable circuitry portion 314 to now operate as a free-running oscillator. Hence the combination of circuit portions 212, 314 provides in effect a gated oscillator; the circuit portion 312 comprising the gate which is variable as a function of a previous setting of the variable resistor 318. Hence upon closing of the switch 302 as explained hereinabove, the circuit will provide at point 320 a number of negative pulses, the number thereof being determined by the setting of the variable resistor 318. The output at 320 is employed to provide an identification code to be recorded on the write-in paper tape designating the office for which the write-in vote was made. As shown in FIG. 24, the output signal on point 320 is electrically connected to the binary counter which thereupon records the number of code pulses received.

Thus as explained hereinabove, whenever a voter wishes to write-in his selection, assuming absence of interlock prevention in this particular office, he raises the door 80; and as illustrated schematically at FIG. 24A the action of raising the door performs the following functions. First, cancel switch 322 (FIGS. 24, 24A) will be thereby momentarily closed thereby providing a momentary negative pulse to the write-in module programming switch 330 (FIG. 12). As shown therein when programmed for a single office arrangement, switch 330 stands open whereby the momentary negative pulse is ineffectual. As the write-in door is raised still further it momentarily closes switch 334 (FIGS. 24, 24A) thereby providing a negative pulse to the base of transistor 310 (FIG. 12) and forcing the same to conduct. This results in an interlock action such as was previously described in conjunction with the individual candidate and single office interlock, as shown schematically at FIG. 9. Simultaneously, point 336 (FIG. 12) will supply substantially ground potential to the doorlock solenoid 338 (FIG. 24) thereby energizing the latter and releasing the mechanical lock to the door which is positioned to normally prevent further raising of the door.

Thus, whereas the door travel is initially limited as illustrated schematically at FIG. 24A to the lower level of the diagram by solenoid 338, it is now free to be raised to the top elevation of the window. However just before the door reaches the end of its upper travel it closes a switch 342 (FIGS. 24, 24A, 23A) thereby supplying a negative voltage to the identification solenoids 82 (FIGS. 23B, 23C, 24) causing the punch bars 83 to perforate the tape for identification purposes as shown at 339 in FIG. 23D, as previously explained hereinabove. The raised door is then automatically held in open position by electromagnet 346 (FIGS. 23B, 24). The voter now writes in the name of his chosen candidate and thus the write-in vote is completed. By disengagement of the plug 74 from the receptacle 76 the write-in area circuitry will be deenergized, including the electromagnet 346 whereby the door drops shut. This action also releases the punch rods 83 whereby their associated springs 83a withdraw the paper perforating punches from the write-in tape.

To prevent a voter from writing-in more than one vote for the same candidate and office, the write-in paper tape is caused to be perforated as shown at 350 (FIG. 23D) prior to the entrance of each voter into the machine. Hence the area on the tape between successive "separating marks" on the tape include all of the write-ins made by each voter. Thus, although no infringements on the voter's secrecy rights have been made, when the tape is canvassed at the end of the voting day any multiple votes for the same candidate for the same office by the same voter will be readily recognized and invalidated. This is effected by reason of the fact each time a voter depresses the exit button 60 the solenoid 214 is deenergized (FIGS. 23B, 23C, 24) thereby causing punch 216 to perforate the tape at 350 (FIG. 23D) as previously explained.

In event a voter attempts to add a write-in vote after his voting rights have been exhausted by previous voting, his attempt to lift the write-in area door 80 (thereby actuating vote switch 334) will not cause transistor 310 to conduct because the applied negative trigger voltage will be grounded as described in connection with operation of the candidate's single office interlock. Hence, the door lock solenoid 338 will not be energized and the door travel will therefore be mechanically stopped at the level 340 which will not expose the paper tape for further writing.

When the voter first lifts the door a bracket 360 thereon (FIG. 23A) lifts a pin 362 thus causing an arm 364 to rock about a pivot 365. A latch 366 associated with the other end of the arm 364 then allows the arm to move so that the door may raise a distance equal to the lower area of FIG. 24a up to the level 340 thereon. (In FIG. 24A the vertical distance up to level 340 is exaggerated.) This lifts a pin 368 carried by arm 364, thus allowing spring 370 to tilt arm 372 about a pivot point 374. The arm 372 carries mercury switches 322, 334 which then provide a momentary negative pulse attempting to energize transistor 310 (FIG. 12) which in turn attempts to energize solenoid 338. If interlock on contact T15 (FIG. 12) is absent, the transistor 310 will start conducting: energizing the solenoid 338 which then pushes latch 366 to pivot about its fulcrum 369 to relase the arm 364. The voter may then continue to lift the door beyond the lock 340 to its wide open position. But if the interlock is present, transistor 310 fails to conduct and solenoid 338 remains inactive, and hence maintains a mechanical lock on the door.

As the voter lifts the door, the arm 364 engages a pin 376 which is carried by a lever 378 (FIGS. 23A, 23B) which pivots upon a reel ratchet shaft 380, thereby lifting spring-biased ratchet pawl 382 to advance a ratchet wheel 384 carrying the tape take-up spool 386. This advances the paper tape 81. A holding pawl 388 is provided to prevent intermediate return motions of the tape. As shown in FIG. 23B, the tape reels freely from a supply roll 390, and then slides through guide plates 392-394 and thence passes to the take-up reel.

When the door is lifted pin 376 also lifts an arm 395 which pivots on the shaft 365, and the arm 395 ultimately actuates a switch 342 to close the circuit to the identification solenoids 82 as explained hereinabove. This also energizes the door holding electromagnet 346. The latch 366 then holds the arm 395 up against its spring 396 until the solenoid 338 is again deenergized, either when the voter pulls out the write-in plug 75 or when the write-in module is programmed for a group office downward motion of the door kicks off the cancelling switch 322 thereby stopping conduction of transistor 310, and de-energizing solenoid 338. After a write-in vote is made for a single office, the latch 366 holds arm 395 up. If the voter then lowers the door 80 thereby depressing cancel switch 322, the transistor 310 will not stop conducting since switch 330 is open, thereby meeting single office requirements. Thus relay 338 remains energized, maintaining arm 395 in up position. Since pin 376 is normally returned by arm 395, the paper tape advance mechanism will not be actuated by movements of the door up and down, and therefore will not allow unauthorized additional write-in votes in the single office arrangement.

In some jurisdictions the election law provides for the casting of more than one vote by one voter for the same office; the total number of votes permitted each voter being locally regulated, according to the election requirements. For example, in some jurisdictions a voter is permitted to vote for two candidates, while in other cases the voters are allowed to vote for as many as 40 or more candidates. This arrangement is generally referred to as a "group office" arrangement permitting each voter to cast an "n" number of selections out of a possible "m" number of candidates. This is sometimes referred to as "n of m" voting.

Figure 11:
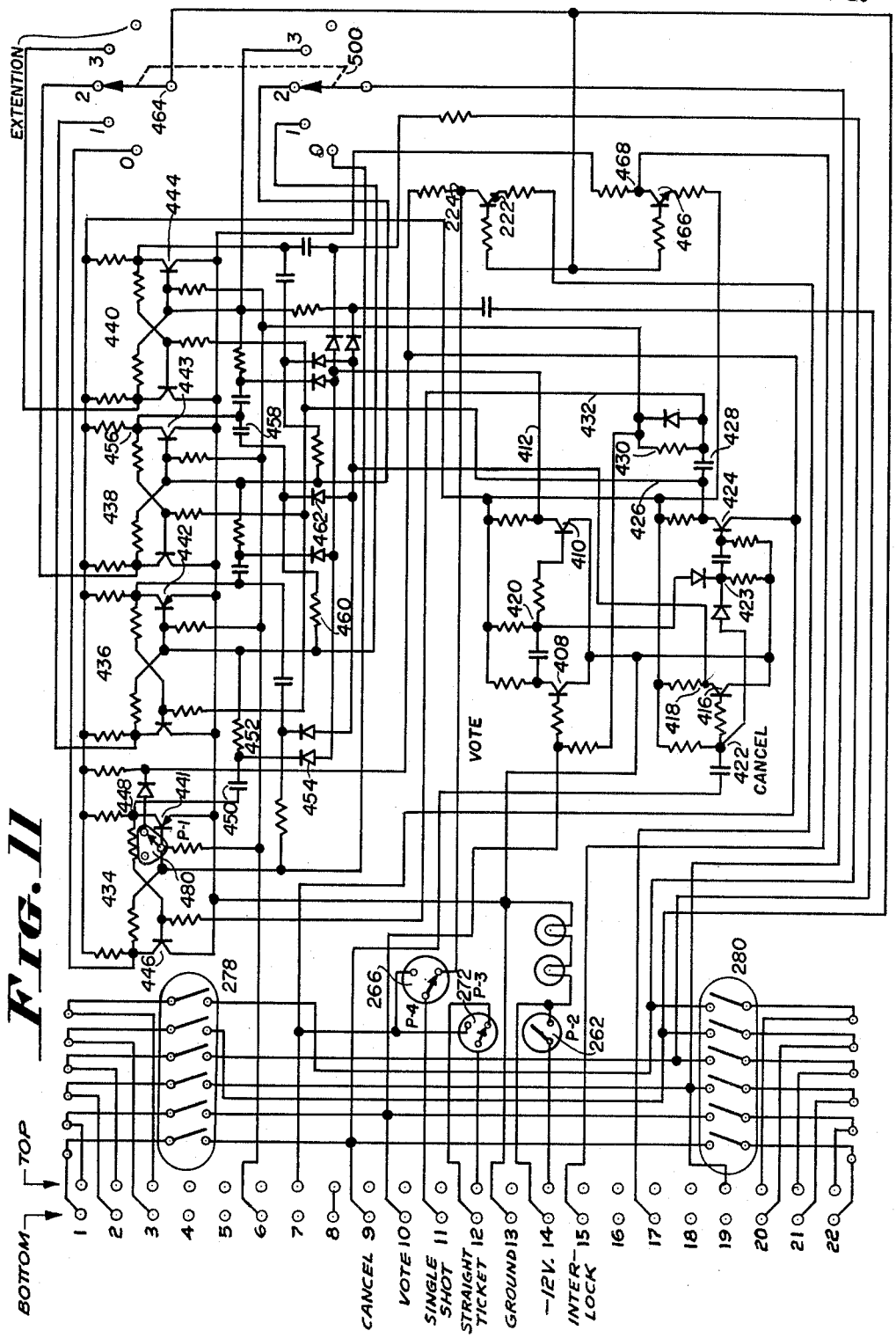
FIG. 11 is a schematic diagram of one of the group office or "O-G" modules.

Thus, in such situations the vote prohibiting interlocks hereinabove described must be arranged so as to become operative only after a predetermined number "n" of votes have been cast by a single voter for the group office. This requires that a vote counting or computing device be employed which will accumulate the votes, and which will then actuate the vote prohibiting interlock, thus preventing any further votes. The vote computer for this purpose will sometimes hereinafter be referred to as the "n of m" counter. Inasmuch as the system must accommodate voter changes of mind and cancellation of selections, the "n of m" counter must be capable of adding and subtracting votes. A suitable "n of m" counter is schematically illustrated at FIG. 11 of the drawing herewith, and its operation will be more fully explained hereinafter.

The "n of m" counter circuitries are located in group office modules which physically may resemble the single office modules as described hereinabove. The group office area arrangement on the face of the voting panel may be easily arranged to assume the format of a typical ballot and may by way of specific example be arranged similar to the single office arrangement in the left hand column of FIG. 2 of the drawing herewith. The number of candidates of course may be substantially larger than shown in the drawing, and the write-in module may be included if desired.

As explained hereinabove in connection with FIG. 9 for example, when the voter makes a selection by depressing the voting switch 112, the transistor 126 will start conducting while the transistor 124 will stop conducting. At this instant point 132 will change its potential from substantially zero potential to −12 volts. This voltage step function will be differentiated by capacitor 402 and resistor 404 (FIG. 9), and a resultant negative pulse will be conducted through the diode 406 to the connector contacts T10 and B10. Through the back panel wiring of FIG. 25, this negative pulse will be transmitted to a contact B10 of the n of m counter circuitry as shown in FIG. 11. From thereon this negative pulse will be supplied to a vote input stage comprising transistors 408-410 and associated components. The output of the vote input circuitry at 412, hereinafter referred to as a "forward drive," will be supplied to a bi-directional ring counter as shown in the upper portion of FIG. 11.

Similarly, cancellation of a previous selection, by closing of the cancel switch 115 will force transistor to start conducting, and hence the voltage of point 132 will return to substantially ground potential. This positive voltage step function differentiated by the components 402, 404 will provide a positive pulse which will be transmitted through diode 414 to the connector contacts T9 and B9. This in a similar way will transmit the positive cancellation pulse through a contact B9 (FIG. 11) to the input stage of a vote cancel input stage comprising transistor 416 and associated components. The output of this cancel input stage at point 418 is referred to hereinafter as a "backward drive" and is supplied again to the bi-directional ring counter at the upper portion of FIG. 11. A vote signal from the point 420 of the input stage, and a cancel signal from point 422 of the cancel input stage are mixed together at point 423, 423 and fed to a transistor 424. Transistor 424 will be hereinafter referred to as the "ring drive" generator. The output of the ring drive generator at point 426 delivers negative pulses whenever a vote or cancel signal is received. Hence, the bi-directional ring counter receives a forward drive delivering a negative pulse whenever a vote is cast; secondly, it receives a backward drive negative pulse whenever a cancellation of a vote is made; and the ring drive will receive a negative pulse for each vote or cancel signal.

The bi-directional ring counter comprises a series of bi-stable multi-vibrators as indicated at 434, 436, 438 and 440 (FIG. 11). For the purpose of this discussion each counter stage is considered as being "on" when the transistors thereof as indicated at 441, 442, 443, 444 thereof are conducting; and are termed to be "off" when these transistors are nonconducting. When the equipment is energized, by an opening of the machine by the voter, the counter stage 434 which is the "zero" vote stage of the unit, will be forced into "on" condition by the "pre-vote set" negative pulse. All the other stages are thereby set to "off" position. The first vote entering the system through the vote input circuitry provides a forward drive negative pulse, and simultaneously a ring drive negative pulse. The ring drive negative pulse will switch off stage 434 by applying a negative pulse to the base of transistor 446. This action will generate a negative pulse at point 448 and transmits the same to the forward "and" gate consisting of condensor 450, resistor 452 and diode 454. The presence of a negative pulse on the forward drive through diode 454 will open this gate and allow stage 436 to be switched "on." Thus, stage 436 represents a vote of one. Similarly, the next voting action will switch stage 436 "off" and stage 438 "on," thus representing a vote of two, and so on throughout the chain of counter stages; it being understood that the required number of stages will be provided according to the number of candidates to be voted for.

As stated hereinabove, the presence of a "cancel" vote in the cancel input circuit will generate a negative pulse on backward drive, as well as on ring drive. The ring drive backward pulse in similar fashion will cancel the existing "on" of the stage of the multi-vibrator unit. For example, while stage 438 is in "on" condition before a cancel vote signal is received, the negative ring drive pulse will switch this stage off. At this time the point 456 will develop a negative pulse, but this will fail to switch stage 440 into "on" condition because of the absence of a gate opening forward drive in the associated circuitry. However, the present negative pulse on backward drive will open the gate consisting of condensor 458, resistor 460 and diode 462 and pass the negative pulse to the base of transistor 442 thereby switching stage 436 "on." Thus, the count of the votes in this system will be reduced from 2 to 1. Thus, it will be appreciated that the "n of m" counter system comprises a series of counter stages interconnected by gated transmission paths which will function to either add or subtract votes signals as generated by voting or cancelling action.

Upon the initial activation of the equipment the zero stage 434 is forced to conduct as a result of the pre-vote signal received at contact T7, as explaned hereinabove. The "n of m" counter will be programmed to accommodate the required number of votes by manual adjustment of switch 464 (FIG. 11). For example, as shown in the drawing, the system is programmed to provide interlock after two votes have been cast. This is effected by applying negative voltage to the base of the transistor 466 whereupon point 468 will become substantially ground potential and through the contact B15 will interlock all unvoted candidate and write-in module circuits. The same negative voltage from switch 464 will be applied to the base of transistor 222, and thereby upon the application of an anti-single-shot interrogating signal through contact B17 will respond to the number of votes cast and in meeting single shot requirements will cancel all the votes in this office if the required number of selections have not been made. On the other hand if the single shot requirement is met, point 224 will remain positive, and no cancellations will result. The remainder of the circuitry of FIG. 11 performs identical functions as do the corresponding parts of the circuitry of FIG. 10 explained in detail hereinabove.

Referring now to FIG. 9, the programming switch 282 must be arranged for group office to short the point 286. Similarly, the write-in as shown schematically in FIG. 12 having a similar programming switch 324, must be programmed for group office by adjusting the switch to short the contact 328. It will be appreciated that after a single vote is entered in the group office, no interlock signal will be impressed on the interlock conductor T15 or B15 (FIG. 9). However, if an interlock voltage is furnished by the "n of m" counter and applied to contacts B15 and T15 (FIG. 9) this will prevent the candidate module to be voted by grounding of the negative standard trigger voltage upon closing of the vote switch 112, through diode 470. Similarly, the write-in module (FIG. 12) will be prevented from being voted by grounding of the trigger through diode 472. In addition, the write-in module (FIG. 12) for a group office will have a programming switch 330 in shorting position.

As explained hereinabove, if it is desired to cast multiple write-in votes for a group office this may be accommodated by intermediate closing and reopening of the write-in door 80, each closing of the door resetting the transistor 308 into conduction. Of course it will be appreciated that attempted reopenings of the door will be permitted or prohibited by the interlock signal as explained hereinabove. Since cancellation of a write-in vote is prohibited by virtue of arrangement of this invention, no cancel signal is supplied by this module to the "n of m" counter; the vote signal passing through the contact T10 (FIG. 12) to the "n of m" counter in the same fashion as in the case of any other candidate module.

In some jurisdictions the local law provides the possibility for endorsement of the same candidate by two or more parties for the same "group" office. In such event this candidate will have assigned a standard module for each party endorsing this candidate. Where the voter may select only one candidate the "single office" interlock is sufficient, but in the case of a group office, in order to prevent a voter voting for this candidate two or more votes in the same group office, the equipment will provide an individual interlock applicable to the standard modules assigned for this candidate only. This is effected by the custodian interconnecting points 277 (FIG. 25) assigned to this candidate. Functionally this interlock is provided in the same manner as a single office interlock as described hereinabove. Hence in a group office, even before the "n of m" counter records a complete number of votes, this candidate is prevented from receiving more than a single vote.

When required, for example to accommodate a large number of candidates for a single or group office the office area on the voting unit face can be extended to occupy any required number of vertical columns. In order to provide required transmission channels between adjacent columns programming switches as indicated at 278, 280 (FIGS. 10, 11) are closed and will provide horizontal transmission paths through backboard having connections as indicated at 474 (FIG. 25) interconnecting T1, B1, T2, B2 and T3, B3 of one column to the contacts T22, B22, T21, B21, T20, B20 of the adjacent column and through the switch device 280 or 278 as the case may be, to the adjacent module. It will be appreciated that in connection with such an arrangement identical modules as shown schematically at FIG. 10 will be used in each column utilized for this office, and identical candidate modules as shown schematically for example at FIG. 9 will be positioned immediately therebelow in vertical alignment. In the case of a group office for example as shown at the right hand side of FIG. 2, the office designation space B1 will be occupied by a group office module ("n of m" counter as shown schematically in FIG. 11) while the space C1 will be occupied by a single office module as shown schematically in FIG. 10. Through the medium of switches 280 of the "n of m" counter module (FIG. 11) and the switches 278 of the single office module (FIG. 10) and the back panel wiring as illustrated at 474 (FIG. 25) electrical connections are made providing transmission of vote signals, cancel signals and interlock signal transmissions.

In event the voting ballot calls for larger number of votes than may be accommodated by a single "n of m" counter module as shown at FIG. 11, two such modules may be mounted in side by side relation in the spaces B1, C1 (FIG. 2) and horizontally interconnected as explained hereinabove through the backboard panel to provide tandem operation of the counters, thereby extending the range of the counter system. In such an arrangement one of the "n of m" counter modules would be designated as the initial counter, and the other module would be designated the extension counter. To program the counter system for tandem operation the initial "$n$ of $m$" counter switch 464 will be set by the custodian to close the "extension" contact (FIG. 11) while the corresponding switch in the extension counter will be set to accommodate the required number of additional votes beyond the capacity of the initial counter. In this case, in extension counter the stage corresponding to the zero stage 434 (FIG. 11) will have its programming switch 480 set to open position in order not to switch this stage "on" upon initial energizing of the equipment. Thus, stage 434 of the extension counter will become stage four of the system, etc.

Local election laws often require provisions whereby the voters may cast so-called "straight ticket" votes for candidates of a selected party. For this purpose a special so-called "straight party module" or P-G module is provided as shown schematically in FIG. 15. Generally, one such module will be located at the top of each column of the voting unit face. Each P-G module will be assigned a party designation. For example, FIG. 8 illustrates the physical form in which such a module may be constructed. Each party module identifies a party, and includes operative components generally similar to those of the candidates type module as shown for example in FIG. 7, except in the case of the party module no provision is made for cancelling selection and therefore only one push button actuated switch is provided. In this case the ballot layout on the face of the voting unit may assume a form similar to that previously discussed. All office modules as shown for example in FIGS. 10, 11 requiring straight party provisions, will be programmed by adjustment of the switch 272 to short the contact 274. In elections allowing straight ticket or individual voting, the programming switch 482 (FIG. 15) will be programmed to short contact 484 thereby providing continuation of power transmission along the contacts T14 and B14.

The P-G module as shown schematically at FIG. 15 includes as shown at the upper portion of the drawing a monostable, multi-vibrator designated 488 and an amplifier stage 490. The output of the multivibrator 488 at point 492 is normally at a positive potential which is transmitted through contact B12 (FIG. 15) via contact T12 and B12 (FIG. 10) into all candidate modules where it will be received by contacts T12 and will supply a positive bias voltage to the base of transistor 126 thereof. As shown in FIG. 15, a switch 494 is provided. Upon momentary closure of this switch a negative pulse will be generated at point 492 which, through the transmission path explained hereinabove, will enter the candidate modules to remove the bias previously maintained on the base of the transistor 126 (FIG. 9). Thus, the transistors 126 of all candidate modules in the selected party will be conducting and hence a straight party vote opertaion is obtained. Since, under this arrangement a single straight ticket vote action by the voter will cause the plurality of votes to be cast, the "$n$ of $m$" counters will be confronted with coincident vote signals, which they are not capable of recognizing and counting. Generally, each party presents the number of candidates for a group office equivalent to the number of votes to be cast for that office by each voter. The number of candidates presented by each party for such an office is never larger than the number of votes to be cast but occasionally a party will present a smaller number of candidates. The machine of the invention is readily adjustable by the program custodian to accommodate this problem. First, however, assuming that the party is presenting a full number of candidates, the operation of the mechanism will now be explained in detail.

Whenever a straight party vote is cast by closure of the switch 492 (FIG. 15) a positive pulse developed at point 496 and is supplied to the amplifier stage 490. The output of the amplifier at point 498 in the form of a negative pulse is transmitted to the "$n$ of $m$" counter (FIG. 11) through contact T19 thereof and through switch 500 which is programmed in duplicate with switch 464 will transmit this negative pulse to the base of transistor 443 as shown for example by the setting of the switch 500 in FIG. 11. The application of this negative pulse to stage 438 will force the stage to "on" condition thereby providing the required interlocks for a vote of two, as shown in this example. Hence, by this means, instead of counting individual vote pulses, the interlock from stage 438 is obtained through the direct setting by the straight party voting.

If desired however, after a straight party vote the ticket may be "split" by cancelling some of the candidates voted, thereby removing the interlock and allowing individual voting for candidates of another party.

In the event a party or parties present an incomplete set of candidates for a given group office as mentioned hereinabove, a compensator module is provided as shown schematically at FIG. 18. This module may have the general overall appearance of the modules referred to hereinabove except that it involves no switch mechanism therefore requires no push button arrangement in the front panel thereof which will be simply bare of any indicia. In the voting panel face this module will be positioned immediately below the modules representing the incomplete sets of candidates for the indicated office by that party. The circuitry of the compensator module as shown schematically at FIG. 18 comprises in effect a gated oscillator generally similar to the components indicated at 312–314 in the write-in module in FIG. 12. As in FIG. 18, the circuit designated 502 comprises a gate which is adjustable by variations of resistor 504, and the circuit 506 comprises an oscillator which is gated by a circuit 502. The output of the gated oscillator appears at point 508 in the form of a group of positive pulses, the number of which is controlled by the setting of the resistor 504.

Hence, a straight party vote in a group office of such an arrangement will, as explained hereinabove, set the "$n$ of $m$" counter to the maximum number of allowable votes, thereby establishing interlock. However, simultaneously with the straight party voting, negative pulse at point 510 (FIG. 15) will be transmitted through contact B7 to the compensating module contact B7 (FIG. 18), thereby initiating the generation of a number of negative compensating pulses at point 508, which are applied to the contacts T9 and B9 as cancelling pulses to the vote cancel input stage of the "$n$ of $m$" counter (FIG. 11). A number of compensating pulses at point 508, regulated by adjustment of resistor 504, must be pre-set to be equivalent to the shortage of candidates in this group office presented by a party. Thus, it will be appreciated that the cancelling pulses applied by the compensator module will set back the "$n$ of $m$" counters by the number of candidate shortages, thereby establishing a correct count of the votes made by the straight party vote. Provision is also made so that wherever the law requires, a straight party vote must be cast first by the voter before he can cast any individual vote. As explained before in connection with the "machine release" circuitry 192 as shown schematically in FIG. 6A, and identical circuitry as indicated at 512 (FIG. 6a) is provided to detect any individual vote made either on a candidate module or on a write-in module to inactivate thereupon a straight party trigger signal. As shown in FIG. 15, this straight party trigger signal is employed to actuate the straight party module when switch 494 thereof is closed. Hence, if such trigger signal is absent the closure of switch 494 will fail to initiate any straight party voting procedure.

Normally the candidates presented by the given party will occupy a number of columns on the voting face. Each of such columns will be headed by a party module assigned to corresponding party. A straight party vote may be effected by pressing any push button of any one of the party modules. Such action by the voter will force all the party modules of the chosen party to activate and initiate a straight ticket vote process in their individual columns. This is accomplished through the use of a programming switch arrangement as indicated at 514 (FIG. 15). As shown herein, six party trunk lines are provided, but it will be understood that any other required number may be provided in lieu thereof. Thus, the machine custodian will assign one of the available trunks to each party to be voted for and will connect all party modules of the same party to the same trunk. It will be understood that once a straight party vote is cast, the straight party trigger signal generated at 512 (FIG. 6a) will be nullified, and thereupon any attempt to vote another straight ticket for a different party will be ineffective. The system automatically provides an arrangement requiring a voter to cancel all candidates individually, which he may have previously voted for, either individually or by straight party voting, before he can cast a new straight party vote.

As previously stated, in some jurisdictions the local laws require that a straight party vote must be cast before any individual votes may be cast. Such requirements may be readily accommodated by providing the machine system so that upon opening of the machine by the voter only the party modules as shown, for example in FIG. 15, will be energized, and the remaining voting unit face remains inactive. However, the system includes provision for automatically activating the complete voting face subsequent to casting of a straight party vote by depressing the push button switch of any party module. Secondly, this operation provides a straight ticket vote as previously explained. This operation may be obtained by first programming the switch 482 (FIG. 15) to short the contact 486 thereby interrupting the power supply to all the modules positioned below the programmed party module. A substitute power transmission will then be provided for utilizing an auxiliary device as shown schematically at FIG. 26 which comprises a self locking relay 520, one of which will be preferably positioned at some convenient location at the top of each column containing party modules. The accessory device includes electrical contacts to be engaged with the equivalent conductors on the backboard circuitry of the unit. It will be appreciated that closing of the switch 494 (FIG. 15) to effect a straight party vote will generate a positive pulse at point 522 which will be transmitted through contact T13 the corresponding contact of the accessory device of FIG. 26. Thus, the relay 520 will be energized and will lock itself in the energized position. Through contact 524 of the relay the power will be supplied via contact T15 to the equivalent contact of FIG. 15, and thereby supplying the power through the contact B14 to the entire voting unit. Thereon the voting process may be performed in standard fashion as explained hereinabove.

In some jurisdictions the election laws provide for the so-called "open primary" type election wherein the voter, before entering the machine, indicates to the election official his party affiliation. The official thereupon programs the machine to powerize only the affiliate party modules of the machine by appropriate setting of the column control switch 84 (FIG. 6). In other jurisidictions the election laws call for the so-called "selective primary" type election wherein the voter may enter the machine without any announcement of his party affilation or preference. In this case, upon opening of the machine by the election official only one party-P module representing each available party will be energized and backlighted. The remaining portion of the voting face will remain inactive. The modules referred to are schematically illustrated at FIG. 16, and as shown therein the circuit comprises a bi-stable multi-vibrator which includes a control switch 526 which corresponds to the voting switch 112 of a typical candidate module as illustrated in FIG. 9. Thus, the voter presses the front panel push plate actuating the switch 526 of the party-P module representing his party selection. In a manner similar to that of the straight party vote explained hereinabove, the power will be supplied through the relay 520 in the auxiliary device (FIG. 26) to the portions of the voting face occupied by the party of his selection. Thus, the machine is now set up so that the voter may make his selection only within the party of his choice. Straight party trigger is utilized in the party-P module in similar fashion as explained hereinabove. Hence, any subsequent attempt to vote a different party will be ineffective. If however the voter subsequently desires to change his party selection he must individually cancel all of his previously voted candidates, and cancel his party selection by closing switch 528 (FIG. 16), which is generally equivalent to the cancel switch 115 of FIG. 9. By this action he restores the equipment to the original condition, where he will now be permitted to make new party selections.

Occasionally, in some jurisdictions the election laws provide an arrangement whereby a group of candidates are presented for a group office equal in number to the number of offices to be elected. In such cases the law usually provides that the entire groups of candidates may be voted for by a single action on the part of the voter. The requirements of this system are very similar to the straight ticket vote requirements as discussed hereinabove. However in this case the vote applies to the office instead of to the party, and therefore may be termed a "straight office" device. This arrangement is accomplished by providing an office module which is generally similar to the party-G type module. The circuitry for this straight office module is schematically illustrated at FIG. 17, and it will be seen by reference thereto that operation of this module is identical to that of the party-G module. The straight office vote is effected by closing of push button switch 530 thereby supplying at point 432 a negative pulse which will automatically vote for all of the candidates presented for this office.

In some jurisdictions, election laws provide that a single voter may cast as many as three votes for the same candidate for the same office; or, he may split his votes between two or more candidates, and may proportion his split votes between the various candidates as he may prefer, up to the total number of three votes. To adapt the machine to this requirement, provision is made in the machine to post for each candidate three separate voting modules, which are assigned different numbers of votes. For example, module number 1 for a certain candidate will represent a vote of one for that candidate. Module number 2 will represent one and a half votes for that candidate. Module number 3 will represent three votes for that same candidate. Hence, since each actuation of any of these modules will eventually advance the corresponding counter at the registry unit for the count of one, the canvassed votes taken from the register at the end of the election day, will be multiplied by the appropriate factor.

In order to prevent overvoting in this situation, a system of interlocks is required. This is accomplished by modifying the "n of m" module, as shown schematically at FIG. 19; the single office module as shown schematically at FIG. 21; the candidate module as shown schematically at FIG. 20; and the write-in module as shown schematically at FIG. 13. The candidate module (FIG. 20) and the write-in module (FIG. 13) will be programmed to accommodate the different vote number assignments as explained hereinabove by programming the jumpers as indicated at 540 (FIG. 20) and at 542 (FIG. 13) as indicated by the programming schedules thereabove.

Whenever the ballot layout on the voting face is not completely filled the module spaces must be occupied by "dummy" or jumper modules as shown schematically at FIG. 14. Thus, for example, as illustrated therein these modules will provide appropriate continuations of transmission paths for any otherwise interrupted column of modules to permit the machine to operate as explained hereinabove. It will of course be appreciated that although only one specific form of the invention has been illustrated and described in detail hereinabove, various changes may be made therein without departing from the spirit of the invention.

I claim:

1. A vote receiving device comprising a casing having an open front ballot face, said face including series of vertically aligned openings, electrical contact means carried by said casing interiorly of said openings, a programmable circuitry panel disposed at the rear of said unit and having electrical conductors interconnected with one of said contact means, vote selection module devices adapted to slip-fit into said openings and each carrying a voting switch and an actuation device therefor at the front end thereof and contact devices at the rear end thereof adapted for slip-fitting connections with corresponding of said first contact means when said modules are disposed in mounted relation within said openings, each of said modules including circuitry interconnecting the switches thereof and selected ones of the contact devices thereof, a counter device for each of said vote selection module devices and conductor means separately interconnecting different leads of the circuitry of said back panel to corresponding counter devices, each vote selection module device including flip-flop means having a first stable state and a vote registering second stable state, said voting switch being connected to said flip-flop means to actuate the same from its first stable state to its second stable state, and at least one of said contact devices in each vote selection module being connected to said flip-flop means to shunt the voting switches of other vote selection modules to ground when any one of the flip-flop means of the several associated vote selection modules is in its second stable state.

2. A vote receiving device comprising a casing having an open front ballot face, said face including series of aligned openings, electrical contact means carried by said casing interiorly of said openings, a programmable circuitry panel disposed at the rear of said unit and having electrical conductors interconnected with first said contact means, vote selection module devices adapted to slip-fit into said openings and each carrying a voting switch and an actuation device therefor at the front end thereof and contact devices at the rear end thereof adapted for slip-fitting connections with corresponding of the first mentioned contact devices when said modules are disposed in mounted relation within said openings, each of said modules including circuitry interconnecting the switches thereof and selected ones of the contacts thereof, said module circuitry including alternatively selectable circuits for preprogramming said module for multiple purposes.

3. A vote receiving device comprising a casing having a voting face, said face including a plurality of aligned openings, said openings mounting in slip-fitting relation therein the corresponding number of module devices, said panel also including a back panel disposed in opposition to said openings, one of said modules comprising a key module including a voter actuated switch and contact means adapted to slip-fit into electrical connection with circuitry carried by said back panel and circuitry interconnecting said switch and said contact means, another one of said modules comprising a computer module including contact means adapted for electrical connection with said circuitry carried by said back panel and having a bi-directional signal registering device and a voting limiting device and a vote cancelling device, others of said modules comprising candidate modules including voter actuated voting switches and cancel switches and contact means adapted to slip-fit into electrical connection with said back panel circuitry, and a compensator module slip-fitted into one of said openings and including a signal generator thereby connected through said back panel circuitry to receive activating signals from said key module and to generate a number of signals equal to the number of the shortage of candidate modules compared to the specified permissible number of votes.

4. A vote receiving device comprising a casing having a voting face and an exit switch actuated by the voter upon conclusion of his voting period, said face including a plurality of aligned openings, said openings mounting in slip-fitting relation therein the corresponding number of module devices, said panel also including a back panel disposed in opposition to said openings, one of said modules comprising a computer module including contact means adapted for electrical connection with said circuitry carried by said back panel and having a bi-directional signal registering device and a vote limiting device and a vote cancelling device, others of said modules comprising candidate modules including voter actuating voting switches and cancel switches and contact means adapted to slip-fit into electrical connection with said back panel circuitry, and a device energized by a signal from said exit switch and controlled by said computer whereby if the voter enters less than a prescribed number of selections in a given group office and actuates the exit switch all votes entered for said group office are automatically cancelled.

5. A vote receiving device comprising a casing having an open front ballot face, said face including series of aligned openings, electrical contact means carried by said casing interiorly of said openings, a programmable circuitry panel disposed at the rear of said unit and having electrical conductors interconnected with said first said contact means, vote selection module devices adapted to slip-fit into said openings and each carrying a voting switch and an actuation device therefor at the front end thereof and contact devices at the rear end thereof adapted for slip-fitting connections with corresponding of the first mentioned contact devices when said modules are disposed in mounted relation within said openings, each of said modules including circuitry interconnecting the switches thereof and selected ones of the contacts thereof, said modules being adapted to enter different numbers of votes for each candidate, a computer recording the votes entered and controlling interlock means preventing entry of more than a prescribed number of votes for said office.

6. In a voting machine having a ballot face providing module-receiving openings, programmable electrical contact means associated with said module-reciving openings, and modules received in said openings and having electrical contacts engaging said programmable contact means, at least some of said modules constituting vote selection devices, each such device including bi-stable flip-flop means, a cancel switch for effecting a first stable state of the flip-flop means and a vote switch for effecting a second stable state of the flip-flop means, said vote switch and said cancel switch being connected to different contacts of each vote selection module, said flip-flop means being connected to at least one other contact of each vote selection module for unidirectionally grounding the same when said flip-flop means is in its second stable state.

7. The voting machine according to claim 6 wherein differentiating means is connected to said flip-flop means, and oppositely poled means connected in parallel between said differentiating means and another pair of said contacts.

8. The voting machine according to claim 7 wherein each vote selection module also includes a program switch movable between single office and group office positions, unidirectional circuit means shunting said vote switch to ground when said flip-flop means is in its second stable state, said program switch connecting another of said contacts to said unidirectional circuit means when in said single office position and unidirectionally to said vote switch when in said group office position.

9. The voting machine according to claim 8 wherein means is provided bypassing said vote switch and connected to still another of said contacts to actuate said flip-flop means to said first stable state thereof.

10. The voting machine according to claim 9 wherein means is provided bypassing said vote switch and connected to a still further of said contacts to actuate said flip-flop means to said second stable state thereof.

11. The voting machine according to claim 10 wherein another of said contacts is unidirectionally connected to ground when said flip-flop means is in its first stable state.

12. The voting machine according to claim 11 wherein another of said contacts is unidirectionally connected to ground when said flip-flop means is in its second stable state.

13. The voting machine according to claim 6 wherein differentiating means is connected to said flip-flop means, and oppositely poled means connected in parallel between said differentiating means and another pair of said contacts.

14. The voting machine according to claim 6 wherein each vote selection module also includes a program switch movable between single office and group office positions;

unidirectional circuit means shunting said vote switch to ground when said flip-flop means is in its second stable state, said program switch connecting another of said contacts to said unidirectional circuit means when in said single office position and unidirectionally to said vote switch when in said group office position.

15. The voting machine according to claim 6 wherein means is provided bypassing said vote switch and connected to still another of said contacts to actuate said flip-flop means to said first stable state thereof.

16. The voting machine according to claim 6 wherein means is provided bypassing said vote switch and connected to a still further of said contacts to actuate said flip-flop means to said second stable state thereof.

17. The voting machine according to claim 6 wherein another of said contacts is unidirectionally connected to ground when said flip-flop means is in its first stable state.

18. The voting machine according to claim 6 wherein another of said contacts is unidirectionally connected to ground when said flip-flop means is in its second stable state.

19. In a voting machine having a ballot face providing module-receiving openings, programmable electrical contact means associated with said module-receiving openings, and modules received in said openings and having electrical contacts engaging said programmable contact means, a plurality of vote selection modules received in at least some of said openings, each such module including flip-flop means, a cancel switch connecting one of said contacts and said flip-flop means to effect one stable state thereof, a vote switch connecting another of said contacts and said flip-flop means to effect the second stable state thereof, bias means connected to said flip-flop means and to another of said contacts for maintaining said flip-flop means in said second stable state thereof, power supply means, pre-vote set means, official switch means and voter controlled switch means connected in series between said power supply means and said pre-vote set means, said pre-vote set means including a switch connected in series between said power supply means and that electrical contact means connected to said contact to which said bias means is connected, and means for momentarily opening the last mentioned switch to set all of said flip-flop means in said first stable state thereof.

References Cited in the file of this patent
UNITED STATES PATENTS

| | | |
|---|---|---|
| 1,086,009 | Abbott | Dec. 9, 1914 |
| 1,141,075 | Rugh | May 25, 1915 |
| 1,142,058 | Rugh | June 8, 1915 |
| 1,170,731 | Bohan et al. | Feb. 8, 1916 |
| 1,179,350 | Currey | Apr. 11, 1916 |
| 1,210,495 | Lausterer | Jan. 2, 1917 |
| 2,054,103 | Shoup et al. | Sept. 15, 1936 |
| 2,259,123 | Wells et al. | Oct. 14, 1941 |
| 2,326,204 | Dowey et al. | Aug. 10, 1943 |
| 2,471,774 | Powell | May 31, 1949 |
| 2,498,380 | Shoup | Feb. 21, 1950 |
| 3,108,743 | Naugle | Oct. 29, 1963 |

OTHER REFERENCES

"Transistorized Modules for Digital Systems," Catalogue M-1 of Computer Control Co., Inc., Dec. 17, 1957, pages 3 and 18 relied on.